(12) United States Patent
Lee et al.

(10) Patent No.: US 12,082,010 B2
(45) Date of Patent: Sep. 3, 2024

(54) METHOD AND APPARATUS FOR BURST TRANSMISSION

(71) Applicant: InterDigital Patent Holdings, Inc., Wilmington, DE (US)

(72) Inventors: Moon-il Lee, Melville, NY (US); Erdem Bala, East Meadow, NY (US); Afshin Haghighat, Ile-Bizard (CA); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 496 days.

(21) Appl. No.: 17/277,774

(22) PCT Filed: Sep. 26, 2019

(86) PCT No.: PCT/US2019/053164
§ 371 (c)(1),
(2) Date: Mar. 19, 2021

(87) PCT Pub. No.: WO2020/069135
PCT Pub. Date: Apr. 2, 2020

(65) Prior Publication Data
US 2022/0132341 A1    Apr. 28, 2022

Related U.S. Application Data

(60) Provisional application No. 62/736,874, filed on Sep. 26, 2018.

(51) Int. Cl.
*H04L 5/14* (2006.01)
*H04W 24/08* (2009.01)
(Continued)

(52) U.S. Cl.
CPC ....... *H04W 24/08* (2013.01); *H04W 72/0446* (2013.01); *H04W 72/1263* (2013.01); *H04W 72/23* (2023.01); *H04W 72/51* (2023.01)

(58) Field of Classification Search
CPC ............. H04W 24/08; H04W 72/0446; H04W 72/1263; H04W 72/23; H04W 72/51; Y02D 30/70
See application file for complete search history.

(56) References Cited

U.S. PATENT DOCUMENTS 8,213,302 B2    7/2012  Wang et al.
9,253,770 B2    2/2016  Yang et al.
(Continued)

FOREIGN PATENT DOCUMENTS

CN    101933289 A    12/2010
CN    106797640 A    5/2017
(Continued)

OTHER PUBLICATIONS

3GPP TSG-RAN WG1 Meeting#93, R1-1806019 Title: Search Space Design fro URLLC (Year: 2018).*
(Continued)

*Primary Examiner* — Faruk Hamza
*Assistant Examiner* — Abusayeed M Haque
(74) *Attorney, Agent, or Firm* — Volpe Koenig

(57) ABSTRACT

Methods and apparatus for burst transmission are provided. A wireless transmit/receive unit (WTRU) is configured to receive configuration information for a periodic search space (P-SS) and a semi-persistent search space (SP-SS). The configuration information may include a monitoring periodicity of the P-SS and a monitoring periodicity of the SP-SS. The P-SS may be associated with the SP-SS. The WTRU is configured to monitor the P-SS with the periodicity of the P-SS. The WTRU is configured to receive a first
(Continued)

message in a first physical downlink control channel (PDCCH) in a slot of the P-SS. The first message may indicate an activation of the associated SP-SS. The WTRU is configured to monitor the SP-SS using the periodicity of the SP-SS. The WTRU is configured to receive a second message in a second PDCCH in a slot of the SP-SS.

16 Claims, 10 Drawing Sheets

(51) Int. Cl.
*H04W 72/0446* (2023.01)
*H04W 72/1263* (2023.01)
*H04W 72/20* (2023.01)
*H04W 72/23* (2023.01)
*H04W 72/51* (2023.01)

(56) References Cited

U.S. PATENT DOCUMENTS

| | | | |
|---|---|---|---|
| 9,408,202 | B2 | 8/2016 | Nazar et al. |
| 10,129,793 | B2 | 11/2018 | Ryoo et al. |
| 10,171,276 | B2 | 1/2019 | Stern-Berkowitz et al. |
| 10,172,135 | B2 | 1/2019 | Deng et al. |
| 10,313,990 | B2 | 6/2019 | Sadeghi et al. |
| 10,383,121 | B2 | 8/2019 | Li et al. |
| 10,652,753 | B2 | 5/2020 | Choi et al. |
| 10,805,951 | B2 | 10/2020 | Li et al. |
| 10,912,118 | B2 | 2/2021 | Tiirola et al. |
| 11,546,940 | B2 | 1/2023 | Hedayat et al. |
| 2010/0272048 | A1 | 10/2010 | Pan et al. |
| 2011/0243048 | A1 | 10/2011 | Wang et al. |
| 2012/0046027 | A1 | 2/2012 | Baker et al. |
| 2013/0163543 | A1 | 6/2013 | Freda et al. |
| 2013/0194956 | A1 | 8/2013 | Sartori et al. |
| 2013/0201834 | A1 | 8/2013 | Klingenbrunn et al. |
| 2014/0105154 | A1 | 4/2014 | Yang et al. |
| 2014/0126490 | A1 | 5/2014 | Chen et al. |
| 2014/0295820 | A1* | 10/2014 | Kim .................. H04W 52/0225 455/418 |
| 2015/0250017 | A1* | 9/2015 | Ingale .................. H04W 72/20 370/280 |
| 2016/0323915 | A1 | 11/2016 | Liu et al. |
| 2017/0048861 | A1 | 2/2017 | Choi et al. |
| 2017/0086172 | A1 | 3/2017 | Dinan |
| 2017/0141833 | A1 | 5/2017 | Kim et al. |
| 2017/0318620 | A1* | 11/2017 | Tseng .................. H04L 1/08 |
| 2018/0007574 | A1 | 1/2018 | Park et al. |
| 2018/0007688 | A1 | 1/2018 | Fu et al. |
| 2018/0014283 | A1 | 1/2018 | You et al. |
| 2018/0110045 | A1 | 4/2018 | You et al. |
| 2018/0135247 | A1* | 5/2018 | Lee .................. D21F 7/083 |
| 2018/0160420 | A1 | 6/2018 | Kim et al. |
| 2018/0338332 | A1* | 11/2018 | Lee .................. H04W 52/0216 |
| 2019/0021064 | A1 | 1/2019 | Ryu et al. |
| 2019/0053159 | A1* | 2/2019 | Wei .................. H04W 52/0216 |
| 2019/0075581 | A1 | 3/2019 | Salem et al. |
| 2019/0159253 | A1 | 5/2019 | Koorapaty et al. |
| 2019/0246395 | A1* | 8/2019 | Huang .................. H04W 72/12 |
| 2020/0059331 | A1* | 2/2020 | Wong .................. H04W 72/0446 |
| 2020/0187236 | A1 | 6/2020 | Moon et al. |
| 2021/0360674 | A1* | 11/2021 | Lim .................. H04L 5/0098 |
| 2021/0368541 | A1 | 11/2021 | Hedayat et al. |
| 2023/0232456 | A1 | 7/2023 | Hedayat et al. |

FOREIGN PATENT DOCUMENTS

| | | |
|---|---|---|
| CN | 107005960 A | 8/2017 |
| CN | 107079305 A | 8/2017 |
| CN | 107431591 A | 12/2017 |
| CN | 107437979 A | 12/2017 |
| JP | 2012-525756 A | 10/2012 |
| TW | 201625044 A | 7/2016 |
| WO | WO 2013/025086 A2 | 2/2013 |
| WO | WO 2016/122113 A1 | 8/2016 |
| WO | WO 2016/175486 A1 | 11/2016 |
| WO | WO 2017/026086 A1 | 2/2017 |
| WO | 2017079574 A1 | 5/2017 |
| WO | WO 2017/193265 A1 | 11/2017 |
| WO | WO 2018/008944 A1 | 1/2018 |
| WO | 2018/031327 | 2/2018 |
| WO | WO-2018031727 A1 * | 2/2018 .......... H04B 17/373 |
| WO | 2018128439 A1 | 7/2018 |
| WO | 2019/140060 | 7/2019 |
| WO | WO 2020/069135 A2 | 4/2020 |

OTHER PUBLICATIONS

R1-1807353, 3GPP, "Remaining issues on control resource set and search space", 7.1.3.1.2, Qualcomm Incorporated, 3GPP TSG RAN WG1 #93, Buson, Korea, May 21-May 25, 2018, 11 pages.

R2-1711904, "UE Power Saving during Active State", 10.3.1.10, Qualcomm Incorporated, 3GPP TSG RAN WG2 #99bis, Prague, Czech, Oct. 9-13, 2017, 9 pages.

WO2018128439, Japanese Application No. 2021516556, Notice of Rejection dated Jun. 7, 2022. *machine translation enclosed.

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "Evaluation of UE Power Saving Techniques," 3GPP TSG RAN WG1 #96, R1-1902618, Athens, Greece (Feb. 25-Mar. 1, 2019).

Interdigital Inc., "On UE Power Saving Techniques," 3GPP TSG RAN WG1 #96, R1-1902619, Athens, Greece (Feb. 25-Mar. 1, 2019).

Interdigital Inc., "PDCCH-based Power Saving Signal Design Considerations," 3GPP TSG RAN WG1 #96b, R1-1905409, Xi'an, China (Apr. 8-12, 2019).

Interdigital Inc., "PDCCH-based Power Saving Signal Design," 3GPP TSG RAN WG1 #97, R1-1907104, Reno, USA (May 13-17, 2019).

Nokia et al., "SC-MCCH transmission for NB-Iot," 3GPP TSG RAN WG1 Meeting #86-bis, R1-1608884, Lisbon, Portugal (Oct. 10-14, 2016).

Nokia et al., "SC-MTCH transmission for NB-Iot," 3GPP TSG RAN WG1 Meeting #86-bis, R1-1608885, Lisbon, Portugal (Oct. 10-14, 2016).

(56) References Cited

OTHER PUBLICATIONS

Nokia et al., "SC-PTM search space design for NB-Iot," 3GPP TSG RAN WG1 Meeting #86-bis, R1- 1608883, Lisbon, Portugal (Oct. 10-14, 2016).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.2.0 (Jul. 2018).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.6.0 (Jun. 2019).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.2.0 (Jun. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.2.2 (Jun. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.6.0 (Jun. 2019).
Third Generation Partnership Project, "Technical Specification Group Radio Access Network; NR; Physical channels and modulation (Release 15)," 3GPP TS 38.211 V15.2.0 (Jun. 2018).
Third Generation Partnership Project, "Technical Specification Group Radio Access Network; NR; Physical channels and modulation (Release 15)," 3GPP TS 38.211 V15.6.0 (Jun. 2019).
Third Generation Partnership Project, "Technical Specification Group Radio Access Network; NR; Multiplexing and channel coding (Release 15)," 3GPP TS 38.212 V15.6.0 (Jun. 2019).
Third Generation Partnership Project, "Technical Specification Group Radio Access Network; NR; Multiplexing and channel coding (Release 15)," 3GPP TS 38.212 V15.2.0 (Jun. 2018).
Third Generation Partnership Project, "Technical Specification Group Radio Access Network; NR; Physical layer procedures for control (Release 15)," 3GPP TS 38.213 V15.2.0 (Jun. 2018).
Third Generation Partnership Project, "Technical Specification Group Radio Access Network; NR; Physical layer procedures for control (Release 15)," 3GPP TS 38.213 V15.6.0 (Jun. 2019).
Third Generation Partnership Project, "Technical Specification Group Radio Access Network; NR; Physical layer procedures for data (Release 15)," 3GPP TS 38.214 V15.2.0 (Jun. 2018).
Third Generation Partnership Project, "Technical Specification Group Radio Access Network; NR; Physical layer procedures for data (Release 15)," 3GPP TS 38.214 V15.6.0 (Jun. 2019).
Third Generation Partnership Project, "Technical Specification Group Radio Access Network; NR; Radio Resource Control (RRC) protocol specification (Release 15)," 3GPP TS 38.331 V15.6.0 (Jun. 2019).
Third Generation Partnership Project, "Technical Specification Group Radio Access Network; NR; Radio Resource Control (RRC) protocol specification (Release 15)," 3GPP TS 38.331 V15.2.1 (Jun. 2018).
Third Generation Partnership Project, "Technical Specification Group Radio Access Network; NR; User Equipment (UE) radio access capabilities (Release 15)," 3GPP TS 38.306 V15.2.0 (Jun. 2018).
Third Generation Partnership Project, "Technical Specification Group Radio Access Network; NR; User Equipment (UE) radio access capabilities (Release 15)," 3GPP TS 38.306 V15.6.0 (Jun. 2019).
CN 107437979 A, U.S. Pat. No. 9,408,202 B2.
Third Generation Partnership Project (3GPP), "Open Issues on BWP", Qualcomm Inc., 3GPP TSG RAN WG1 #91, Reno, NV, USA, Nov. 27-Dec. 1, 2017, R1-1720693, 15 pages.
Third Generation Partnership Project (3GPP), "On UE Power Savings", Samsung, 3GPP TSG RAN WG1 Meeting #92, Athens, Greece, Feb. 26-Mar. 2, 2018, R1-1801977, 5 pages.
Third Generation Partnership Project (3GPP), "Views on UE power saving", Qualcomm Inc., 3GPP TSG RAN WG1 Meeting #94, Gothenburg, Sweden, Aug. 20-24, 2018, R1-1809462, 11 pages.
Third Generation Partnership Project (3GPP), "Remaining issues on bandwidth part and CA", Huawei, HiSilicon, 3GPP TSG RAN WG1 Meeting #94, Gothenburg, Sweden, Aug. 20-24, 2018, R1-1809752, 24 pages.
Third Generation Partnership Project (3GPP), "System Architecture for the 5G System", Technical Specification Group Services and System Aspects, Stage 2, Release 15, 3GPP TS 23.501 V15.0.0, Dec. 2017, 181 pages.
Third Generation Partnership Project (3GPP), "System Architecture for the 5G System" Technical Specification Group Services and System Aspects, Stage 2, Release 15, 3GPP TS 23.501 V15.4.0, Dec. 2018, 236 pages.
Third Generation Partnership Project (3GPP), "Physical Layer Procedures", Technical Specification Group Radio Access Network; Evolved Universal Terrestrial Radio Access (E-UTRA), Release 14, 3GPP TS 36.213 V14.2.0, Mar. 2017, 454 pages.
Third Generation Partnership Project (3GPP), "Physical Layer Procedures", Technical Specification Group Radio Access Network; Evolved Universal Terrestrial Radio Access (E-UTRA), Release 14, 3GPP TS 36.213 V14.4.0, Sep. 2017, 462 pages.
Third Generation Partnership Project (3GPP), "Physical Layer Procedures", Technical Specification Group Radio Access Network; Evolved Universal Terrestrial Radio Access (E-UTRA), Release 14, 3GPP TS 36.213 V14.8.0, Sep. 2018, 468 pages.
Third Generation Partnership Project (3GPP), "Physical Layer Procedures", Technical Specification Group Radio Access Network; Evolved Universal Terrestrial Radio Access (E-UTRA), Release 15, 3GPP TS 36.213 V15.3.0, Sep. 2018, 546 pages.
Third Generation Partnership Project (3GPP), "Physical Channels and Modulation", Technical Specification Group Radio Access Network, NR, Release 15, 3GPP TS 38.211 V2.0.0, Dec. 2017, 73 pages.
Third Generation Partnership Project (3GPP), "Physical Channels and Modulation", Technical Specification Group Radio Access Network, NR, Release 15, 3GPP TS 38.211 V15.0.0, Dec. 2017, 73 pages.
Third Generation Partnership Project (3GPP), "Physical Channels and Modulation", Technical Specification Group Radio Access Network, NR, Release 15, 3GPP TS 38.211 V15.3.0, Sep. 2018, 96 pages.
Third Generation Partnership Project (3GPP), "Multiplexing and Channel Coding", Technical Specification Group Radio Access Network, NR, Release 15, 3GPP TS 38.212 V15.0.0, Dec. 2017, 82 pages.
Third Generation Partnership Project (3GPP), "Multiplexing and Channel Coding", Technical Specification Group Radio Access Network; NR, Release 15, 3GPP TS 38.212 V15.3.0, Sep. 2018, 99 pages.
Third Generation Partnership Project (3GPP), "Physical Layer Procedures for Control", Technical Specification Group Radio Access Network; NR, Release 15, 3GPP TS 38.213 V2.0.0, Dec. 2017, 56 pages.
Third Generation Partnership Project (3GPP), "Physical Layer Procedures for Control", Technical Specification Group Radio Access Network; NR, Release 15, 3GPP TS 38.213 V15.0.0, Dec. 2017, 56 pages.
Third Generation Partnership Project (3GPP), "Physical Layer Procedures for Control", Technical Specification Group Radio Access Network; NR, Release 15, 3GPP TS 38.213 V15.3.0, Sep. 2018, 101 pages.
Third Generation Partnership Project (3GPP), "Radio Resource Control (RRC) Protocol Specification", Technical Specification Group Radio Access Network; NR, Release 15, 3GPP TS 38.331 V15.0.0, Dec. 2017, 188 pages.
Third Generation Partnership Project (3GPP), "Radio Resource Control (RRC) Protocol Specification", Technical Specification Group Radio Access Network; NR, Release 15, 3GPP TS 38.331 V15.3.0, Sep. 2018, 445 pages.

(56) References Cited

OTHER PUBLICATIONS

Third Generation Partnership Project (3GPP), "Discussion on Required Functionalities for Licensed-assisted Access using LTE", Microsoft Corp., 3GPP TSG-RAN WG1 Meeting #80, Athens, Greece, Feb. 9-13, 2015, R1-150630, 4 pages.

Third Generation Partnership Project (3GPP), "On Configuration of GC-PDCCH for Dynamic SFI", InterDigital Inc., 3GPP TSG RAN WG1 Meeting 91, Reno, USA, Nov. 27-Dec. 1, 2017, R1-1720637, 5 pages.

Third Generation Partnership Project (3GPP), "On Frame Structure for NR-U Operation", InterDigital Inc., 3GPP TSG RAN WG1 Meeting #92bis, Sanya, China, Apr. 16-20, 2018, R1-1804868, 5 pages.

Third Generation Partnership Project (3GPP), "On NR-Unlicensed Channel Access Procedures" InterDigital Inc., 3GPP TSG RAN WG1 Meeting #93, Busan, Korea, May 21-25, 2018, R1-1807036, 6 pages.

Third Generation Partnership Project (3GPP), "On Downlink Signals and Channels for NR-U", InterDigital Inc., 3GPP TSG RAN WG1 Meeting #94, Gothenburg, Sweden, Aug. 20-24, 2018, R1-1809087, 4 pages.

Third Generation Partnership Project (3GPP), "Channel Access Procedure and Coexistence in NR-U", InterDigital Inc., 3GPP TSG RAN WG1 Meeting #94, Gothenburg, Sweden, Aug. 20-24, 2018, R1-1809089, 6 pages.

\* cited by examiner

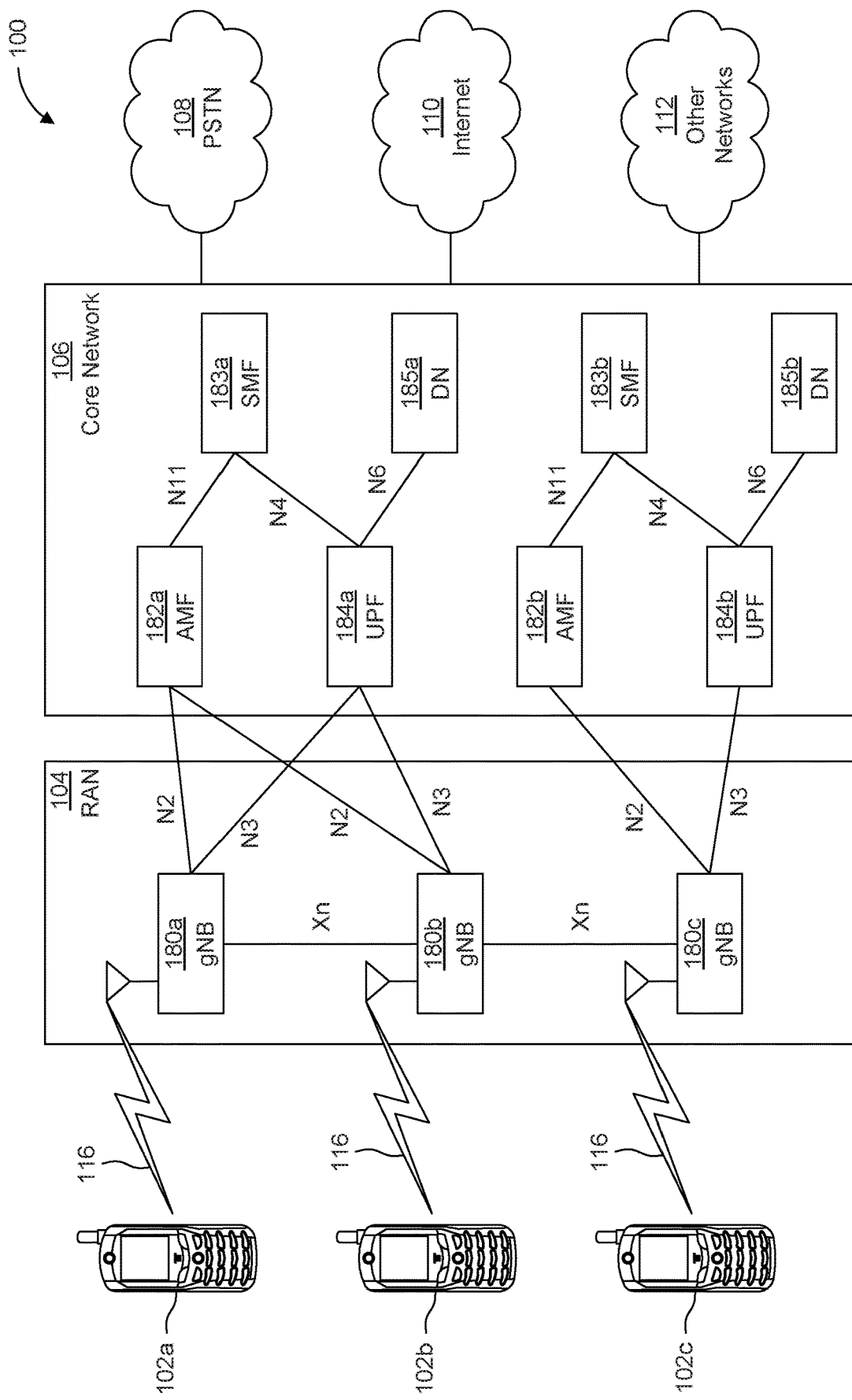

METHOD AND APPARATUS FOR BURST TRANSMISSION

CROSS-REFERENCE TO RELATED APPLICATIONS

This application is the U.S. National Stage, under 35 U.S.C. § 371, of International Application No. PCT/US2019/053164 filed Sep. 26, 2019, which claims the benefit of U.S. Provisional Application No. 62/736,874 filed Sep. 26, 2018, the contents of which are incorporated herein by reference.

BACKGROUND

A wireless transmit/receive unit (WTRU) may monitor or may be assigned with a set of physical downlink control channel (PDCCH) candidates to monitor. A set of PDCCH candidates may be monitored during blind detection of a PDCCH. A search space or a set of search spaces may be or may include the set of PDCCH candidates, for example, to monitor with the blind detection. A search space may be configured with a long periodicity to reduce PDCCH monitoring time to reduce battery consumption of the WTRU when the WTRU has a data traffic that does not occur frequently. However, a long periodicity of a search space may increase a WTRU active time when burst data arrives at the buffer which may require multiple transmissions of a physical downlink shared control channel (PDSCH) or a physical uplink shared control channel (PUSCH) to finish the transmission. Since the uplink transmission bandwidth may be further limited based on the WTRU coverage level, the longer active time may become more significant for uplink burst traffic.

SUMMARY

Methods and apparatus for burst transmission are provided. In an embodiment, a wireless transmit/receive unit (WTRU) is configured to receive configuration information for a periodic search space (P-SS) and a semi-persistent search space (SP-SS). The configuration information may include a monitoring periodicity of the P-SS and a monitoring periodicity of the SP-SS. The P-SS may be associated with the SP-SS. The WTRU is configured to monitor the P-SS with the periodicity of the P-SS. The WTRU is configured to receive a message in a control channel of the P-SS. The message may indicate an activation of the associated SP-SS. The WTRU is configured to monitor the SP-SS using the periodicity of the SP-SS. The WTRU is configured to receive a message in a physical downlink shared channel in a slot of the SP-SS. The monitoring periodicity may indicate a time slot repetition. The configuration information may include a monitoring offset and monitoring mapping. The WTRU may send an indication of a capability to support a SP-SS. The WTRU is configured to stop monitoring the SP-SS based on a SP-SS deactivation determination. The WTRU is configured to monitor in the P-SS with the periodicity of the P-SS. The WTRU is configured to receive message in a control channel of the P-SS. The message may include an updated periodicity of the P-SS. The WTRU is configured to monitor the P-SS with the updated periodicity.

In an embodiment, a WTRU is configured to receive a first downlink control information (DCI) in a physical downlink control channel (PDCCH) in a periodic search space (P-SS). The first DCI may indicate a scheduling configuration for a first aperiodic search space (A-SS). The WTRU is configured to monitor in the first A-SS based on the first DCI scheduling configuration. The WTRU is configured to receive a second DCI in a PDCCH in the first A-SS. The second DCI indicates a scheduling configuration for a second A-SS. The WTRU is configured to monitor in the second A-SS based on the second DCI scheduling configuration. The WTRU is configured to receive a third DCI in a PDCCH of the second A-SS. The third DCI may include a scheduling configuration for a plurality of A-SSs

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1D is a system diagram illustrating a further example RAN and a further example CN that may be used within the communications system illustrated in FIG. 1A according to an embodiment;

DETAILED DESCRIPTION

Figure 1A:
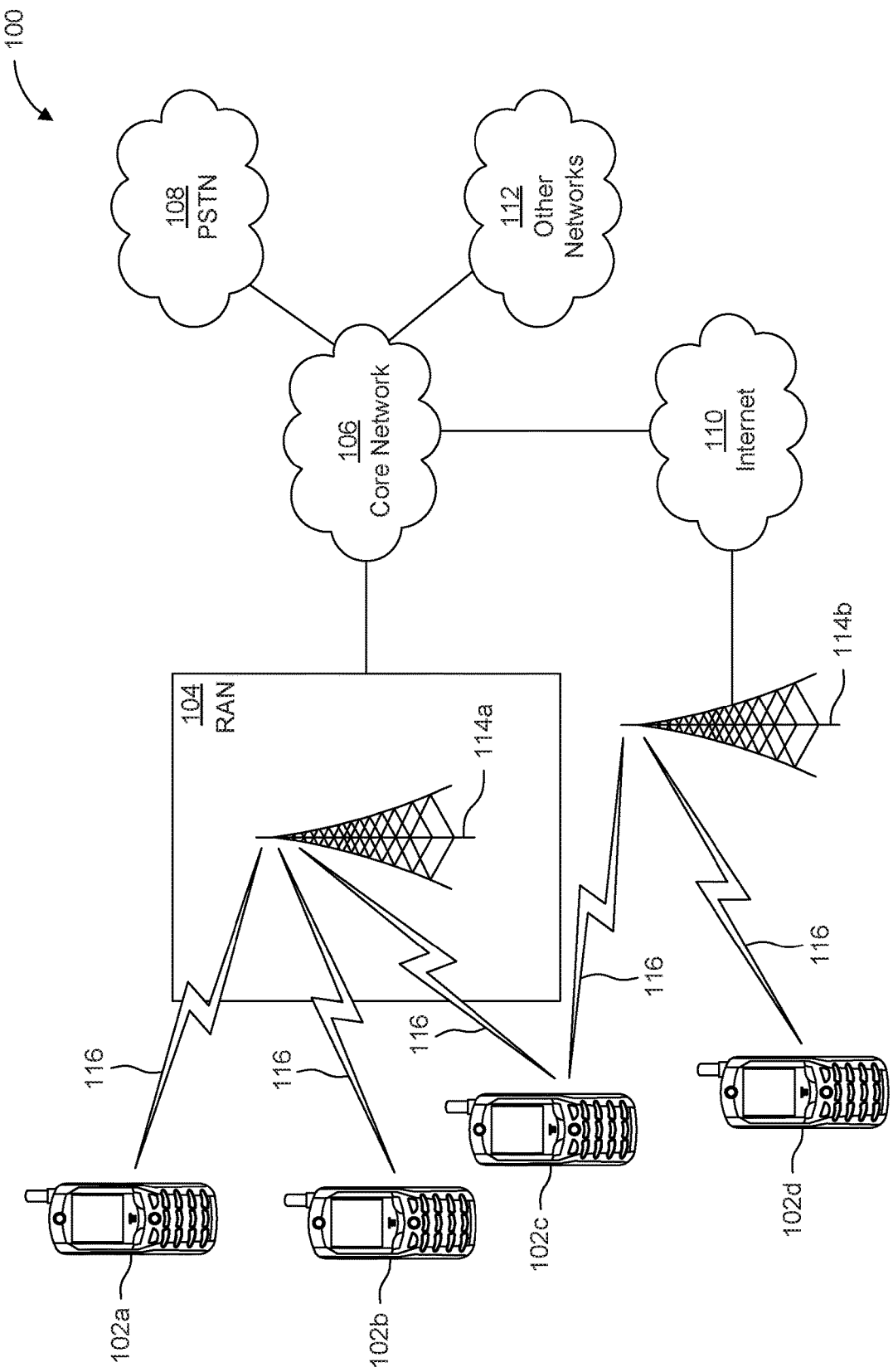
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
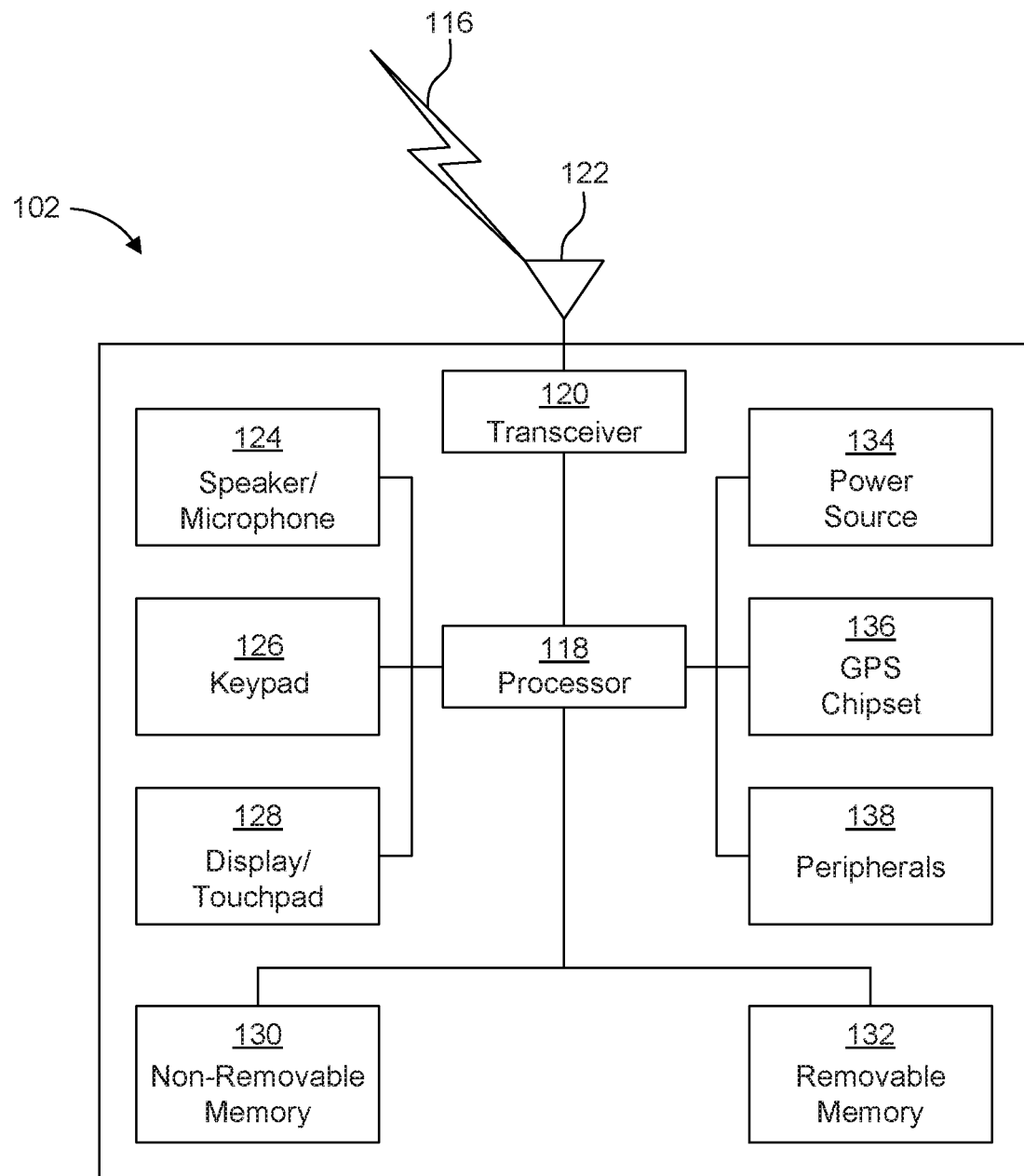
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
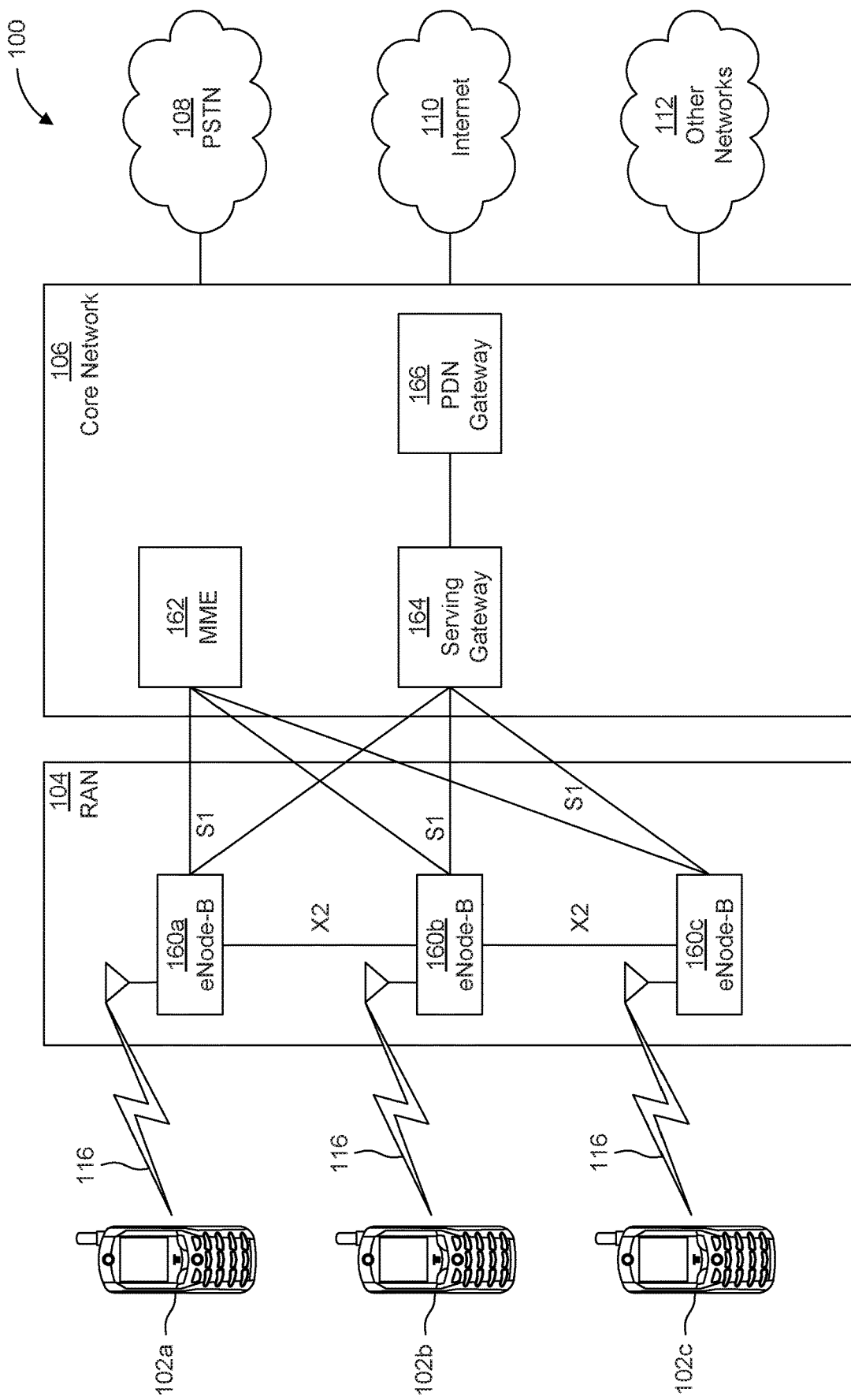
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
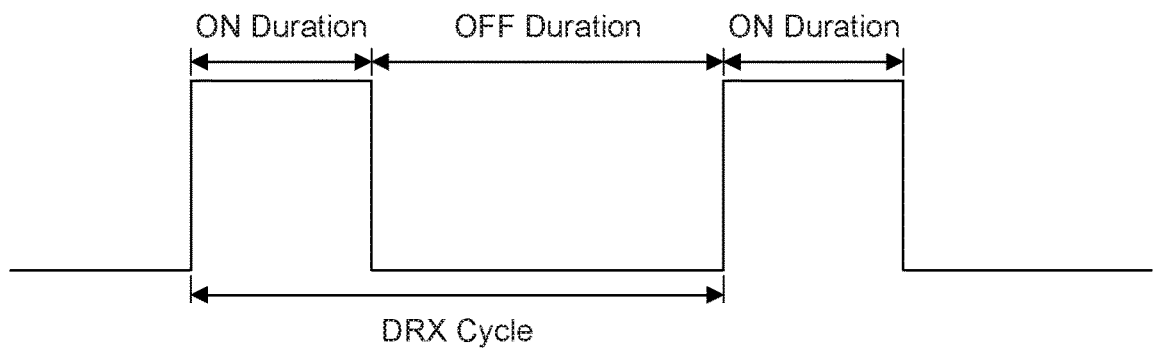
FIG. 2 shows an example of discontinuous reception (DRX)

FIG. 2 shows an example of discontinuous reception (DRX). DRX may be used for battery savings. DRX may have a cycle of an ON duration and an OFF duration, which may be a repetition or a periodic repetition. During DRX, a WTRU may not monitor a downlink (DL) control channel (e.g., PDCCH). In a radio resource control (RRC) connected mode, a WTRU may use connected mode DRX (C-DRX). A WTRU may monitor a configured PDCCH during an ON duration period and the WTRU may sleep or not monitor during an OFF duration. PDCCH is used herein as a non-limiting example of a DL control channel, however, any other type of DL control channel may be used. A DRX cycle may be a short DRX cycle or a long DRX cycle. A WTRU may switch between using a short DRX cycle and a long DRX cycle.

A DRX inactivity timer may determine or may be used to determine a time after a PDCCH occasion in which a PDCCH, that was successfully decoded, indicates an UL or DL user data transmission, for example an initial data transmission. The time may be in terms of TTI duration. The DRX inactivity timer may be used to determine when to go in an OFF duration.

A PDCCH occasion may be a time period that may contain a PDCCH such as a symbol, a set of symbols, a slot, or a subframe. A DRX ON duration may be a duration at the beginning of a DRX cycle. An ON duration timer may determine or may be used to determine a number of PDCCH occasions that may be or may need to be monitored or decoded by a WTRU. For example, PDCCH occasions to monitor or decode may be after wakeup from a DRX cycle or at the beginning of a DRX cycle. The PDCCH occasions may be a consecutive number of PDCCH occasions. The PDCCH occasions may be a non-consecutive PDCCH occasions.

A DRX retransmission timer may determine or may be used to determine a number of PDCCH occasions to monitor when a retransmission may be expected by the WTRU. A DRX retransmission timer may determine or may be used to determine a maximum duration until a DL retransmission may be received or a maximum duration until a grant for UL retransmission may be received.

A DRX short cycle may be a first DRX cycle that the WTRU enters after expiration of a DRX inactivity timer. The WTRU may be in a short DRX cycle until an expiration of a DRX short cycle timer. When the DRX short cycle timer expires, the WTRU may use a long DRX cycle. A DRX short cycle timer may determine or may be used to determine a number of consecutive subframes that the WTRU may follow the short DRX cycle after the DRX inactivity timer has expired.

During an OFF duration, a WTRU may not measure or report channel state information (CSI) in a subframe configured to measure and/or report a periodic CSI.

A WTRU may or may need to monitor a PDCCH or PDCCH occasions during an active time. An active time may occur during an ON duration or may occur during an OFF duration. The active time may begin during an ON duration and continue during an OFF duration. The terms active time and active time of a DRX cycle may be used interchangeably herein.

An active time may include a time when a DRX timer is running such as an ON duration timer, an inactivity timer, a DL retransmission timer, an UL retransmission timer, or a random access contention resolution timer. An active time may include a time when a scheduling request is sent, for example on a PUCCH, and is pending. An active time may include a time when a PDCCH indicating a new transmission addressed to a cell radio network temporary identifier (C-RNTI) of a MAC entity of the WTRU has not been received after successful reception of a random access response for the random access preamble not selected by the MAC entity among the contention-based random access preamble.

A DRX timer may be a timer associated with a DRX. One or more DRX timers may be associated with a DRX. Examples of DRX timers may include, but are not limited to, a DRX ON duration timer (e.g., drx-onDurationTimer), a DRX inactivity timer (e.g., drx-InactivityTimer), a DRX DL retransmission timer (e.g., drx-RetransmissionTimerDL), a DRX UL retransmission timer (e.g., drx-RetransmissionTimerUL), a DRX hybrid automatic repeat request round trip timer (HARQ RTT) timer for UL (e.g., drx-HARQ-RTT-TimerUL), and DRX HARQ RTT timer for DL (e.g., drx-HARQ-RTT-TimerDL).

A DRX inactivity timer may be a duration after a PDCCH occasion in which a PDCCH indicates an initial uplink or downlink user data transmission for the MAC entity. A DRX DL retransmission timer may be a maximum duration until a downlink retransmission is received. Each downlink HARQ process may be associated with a DRX DL retransmission timer. A DRX UL retransmission timer may be a maximum duration until a grant for uplink retransmission is received. Each uplink HARQ process may be associated with a DRX UL retransmission timer. A DRX HARQ RTT timer for the uplink may be a minimum duration before an uplink HARQ retransmission grant is expected by the WTRU or MAC entity. Each uplink HARQ process may be associated with a DRX HARQ RTT timer for the uplink. DRX HARQ RTT timer for the downlink may be a minimum duration before a downlink assignment for HARQ retransmission is expected by the WTRU or MAC entity. Each downlink HARQ process may be associated with a DRX HARQ RTT timer for the downlink.

Figure 3:
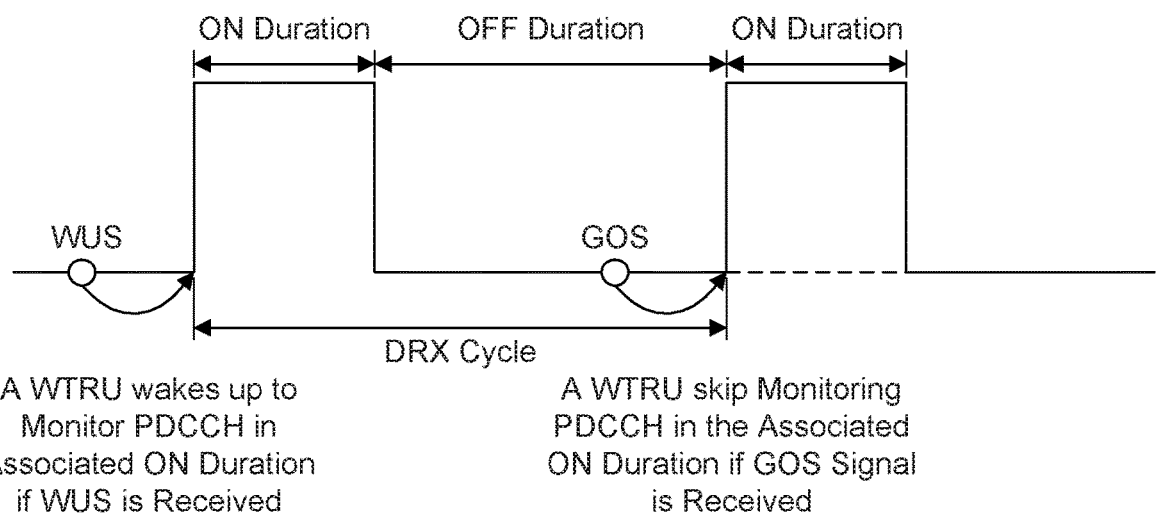
FIG. 3 shows an example of a wake-up signal (WUS) and a go-to-sleep (GOS) with DRX operation.

FIG. 3 shows an example of a wake-up signal (WUS) and a go-to-sleep (GOS) with DRX operation. A WUS may be used with a DRX operation. A GOS may be used with a DRX operation. In a system or network, either WUS or GOS may be used. Both WUS and GOS may be used. A WUS/GOS may be associated with one or more DRX cycles. A WUS/GOS may be transmitted and/or received prior to an associated time or part of an associated DRX cycle. If a WTRU receives a WUS, the WTRU may monitor a PDCCH in ON durations for one or more DRX cycles. If a WTRU receives a GOS, the WTRU may skip monitoring a PDCCH in ON durations for one or more DRX cycles and may stay in sleep mode (e.g., deep sleep).

In a system such as a 3GPP New Radio (NR) for 5G wireless systems, a new structure and design may be adopted for the PDCCH, as well as physical downlink shared channel (PDSCH). Slot-based and non-slot-based transmissions and different rates of monitoring may be used for PDCCH.

A resource element group (REG) may be the smallest building block for a PDCCH. A REG may consist of 12 resource elements (REs) on one OFDM symbol in time and one resource block (RB) in frequency. In a REG, nine REs may be used for control information and three REs may be used for demodulation reference signal (DMRS). Multiple REGs (e.g., 2, 3, or 6), adjacent in time or frequency, may form an REG bundle which may be used with the same precoder and their DMRSs may be used together for channel estimation. Six REGs (e.g., in the format of 1, 2, or 3 REG bundles) may form one control channel element (CCE) which may be the smallest possible PDCCH. A PDCCH may consist of one or multiple CCEs (e.g., 1, 2, 4, 8, or 16 CCEs). The number of CCEs for a PDCCH may be called its aggregation level (AL).

Mapping of REG bundles may use interleaving or non-interleaving. In a non-interleaving mapping, consecutive REG bundles (e.g., adjacent in frequency) may form a CCE and CCEs adjacent in frequency may form a PDCCH. In an interleaving mapping, REGs may be interleaved or permuted before being mapped to CCEs, which may result in non-adjacent REG bundles in one CCE and non-adjacent CCEs in one PDCCH.

A control resource set (CORESET) may be configured by or may comprise at least one of: i) a frequency assignment (e.g., as chunks of six RBs), ii) a length in time (e.g. 1-3 OFDM symbols), iii) a type of REG bundle, and iv) a type of mapping from REG bundles to CCEs, which may use interleaving or non-interleaving. In a bandwidth part (BWP), there may be up to an N (e.g. 3) CORESETs. For example, there may be 12 CORESETs in four possible bandwidth parts.

A WTRU may monitor or may be assigned with a set of PDCCH candidates to monitor. A set of PDCCH candidates may be monitored during a blind detection of a PDCCH. A search space or a set of search spaces for multiple aggregation levels may be or may include a set of PDCCH candidates to monitor such as with blind detection. A search space or set of search spaces may be configured by at least one of: i) an associated CORESET, ii) a number of candidates for or within each aggregation level, and iii) a set of monitoring occasions. The monitoring occasions may include one or more of a monitoring periodicity (e.g., in terms of slots), a monitoring offset, and a monitoring pattern (e.g., 14 bits corresponding to possible patterns of symbols inside a slot).

Figure 4:
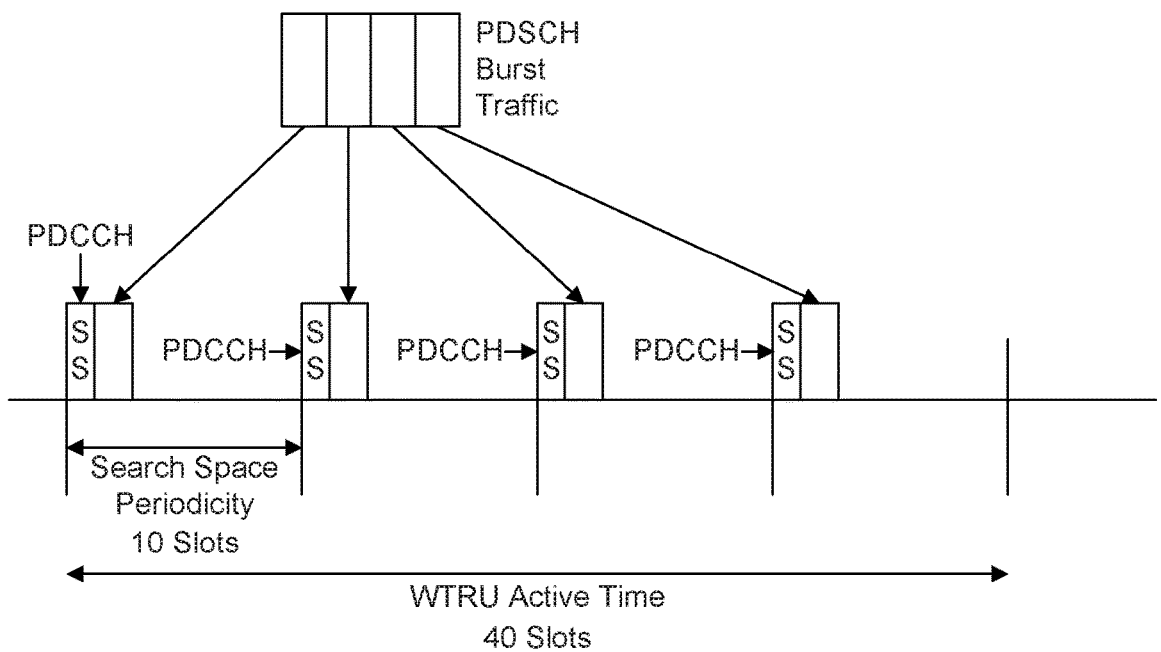
FIG. 4 shows an example of a long WTRU active time for burst traffic.

In NR, a search space may be configured with a long periodicity to reduce PDCCH monitoring time which may be beneficial for lower WTRU battery consumption when the WTRU has data traffic which does not occur frequently such as burst traffic. However, as shown in FIG. 4, long periodicity of a search space may increase a WTRU active time when burst data arrives at the buffer which may require multiple PDSCH or PUSCH transmissions to finish the transmission. Since the uplink transmission bandwidth may be further limited based on a WTRU coverage level, the longer active time may become more significant for uplink burst traffic.

A WTRU may be configured with a CORESET and its associated one or more search spaces. A CORESET configuration may include one or more of: frequency domain resources (e.g., a set of resource blocks used for the CORESET), a number of OFDM symbols, a REG bundle size, a CCE-to-REG mapping type, and a search space configuration which may include one or more of associated CORESET information (e.g., CORESET-id), monitoring slot periodicity, number of decoding candidate per PDCCH aggregation levels, and monitoring symbols within a slot.

The terms search space, PDCCH search space, and PDCCH monitoring occasion may be interchangeably herein. A PDCCH monitoring occasion may be considered as a time instance (e.g., slot, subframe, and symbol) where a WTRU may monitor one or more search spaces. The terms periodicity of a search space, monitoring periodicity of a search space, PDCCH monitoring periodicity, duty cycle of a search space, monitoring gap of a search space, PDCCH monitoring cycle, PDCCH monitoring occasion cycle, periodicity, and search space monitoring occasion cycle may be interchangeably herein.

When a WTRU monitors a search space, the WTRU may attempt to decode one or more PDCCH candidates in the search space. Each PDCCH candidate may comprise one or more CCEs and the number of CCEs for a PDCCH candidate may be referred to as an aggregation level (AL). The terms PDCCH candidate, PDCCH decoding candidate, PDCCH blind decoding candidate, decoding candidate, and blind decoding candidate may be used interchangeably herein.

One or more search space types may be used. Each search space type may have a different time behavior. For example, a first search space type may be a periodic search space (P-SS) and a WTRU may monitor the search space periodically, such as every s slots, once the search space is configured. A second search space type may be a semi-persistent search space (SP-SS) and a WTRU may monitor a SP-SS when the SP-SS is in active state. A third search space type may be an aperiodic search space (A-SS) and a WTRU may monitor an A-SS in one or more time instances, which may be indicated dynamically.

A search space type may be determined based on an indication in an RRC configuration for the search space. The search space type may be determined based on associated DCI format or DCI type which may be monitored in the search space. The DCI format or DCI type may be determined based on a traffic type (e.g., eMBB, URLLC, or mMTC). The search space type may be determined based on a mode of operation (e.g., normal mode, power saving mode). For example, a normal mode may be associated with a P-SS and a power saving mode may be associated with a SP-SS or A-SS.

A search space type may be used for a downlink grant and/or an uplink grant. A downlink grant may be used to schedule a PDSCH and an uplink grant may be used to schedule a PUSCH. A PDSCH and a PUSCH are non-limiting examples of channels and may be substituted for each other in the examples described herein.

When a WTRU may need to monitor one or more search space types in a same slot and a number of blind decoding candidates and/or number of CCEs for channel estimation is larger than a threshold, the WTRU may prioritize the search space based on a search space time-domain characteristic (e.g., periodic, semi-persistent, and aperiodic) and may skip monitoring lower priority search spaces. An A-SS may be the highest priority within WTRU-specific search spaces. A SP-SS may be a higher priority than a P-SS. A common search space may be higher priority than a WTRU-specific search space. If one or more search spaces are the same type of search space or have a same time-domain characteristic, a lower search space identity number may have a higher priority.

WTRU power consumption may be reduced during an active time by adapting PDCCH monitoring to traffic needs (e.g. burst traffic) using a SPSS. The SP-SS may be used with dynamic search space activation/deactivation and/or a dynamic indication of search space monitoring periodicity. A SP-SS may be used when a WTRU is configured with a certain transmission mode such as, for example, a power saving mode or a burst transmission mode.

Figure 5:
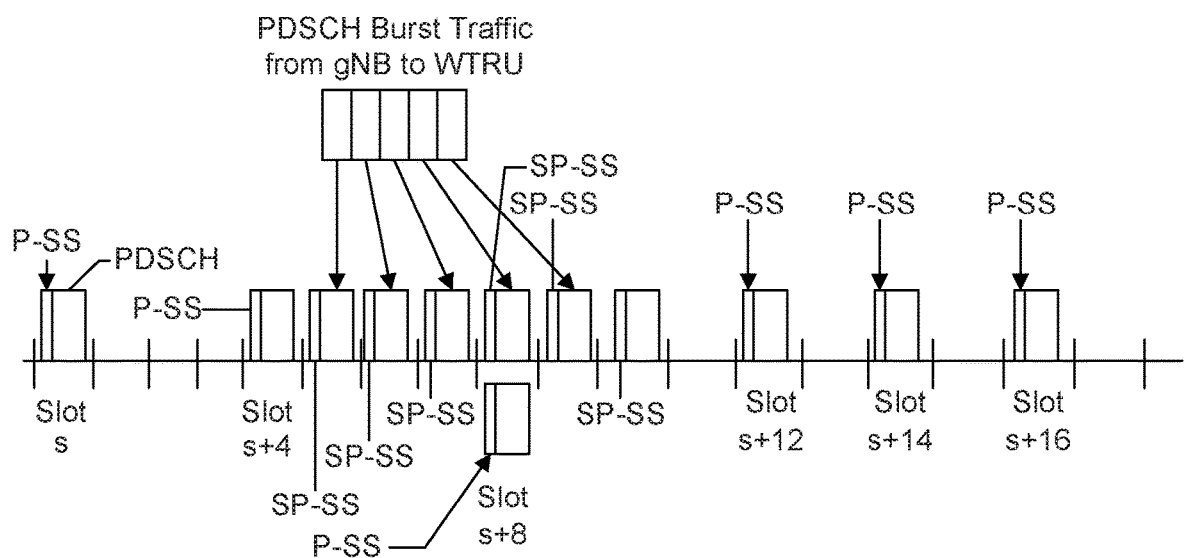
FIG. 5 shows an example of a semi-persistent search space (SP-SS) for support of burst traffic with a long periodic search space (P-SS)

FIG. 5 shows an example of a SP-SS for support of burst traffic with a long P-SS. In FIG. 5, a P-SS is configured with a 4 slot periodicity, for example as shown in slot s, slot s+4, slot s+8, and slot s+12. A WTRU may monitor for a PDCCH in the P-SS (e.g. every 4 slots). A gNB may have burst data to send to the WTRU. A SP-SS may be activated. The SP-SS may be activated via an associated P-SS. The WTRU may monitor the SP-SS in slot s+5, based on the SP-SS activation. A periodicity for the SP-SS may be configured as 1 slot as shown in FIG. 5. The WTRU may monitor the SP-SS starting at slot s+5 and every 1 slot thereafter. The P-SS and SP-SS may overlap in time for example at slot s+8. The SP-SS may be deactivated, for example at slot s+10, and the WTRU may stop monitoring the SP-SS. The WTRU may monitor the P-SS based on the 4 slot periodicity, for example at slot s+12. The PS-SS monitoring periodicity may be updated with a new periodicity, for example in slot s+12, with a 2 slot periodicity. The WTRU may monitor the P-SS with the updated periodicity for example in slot s+14, s+16, and so on.

Figure 6:
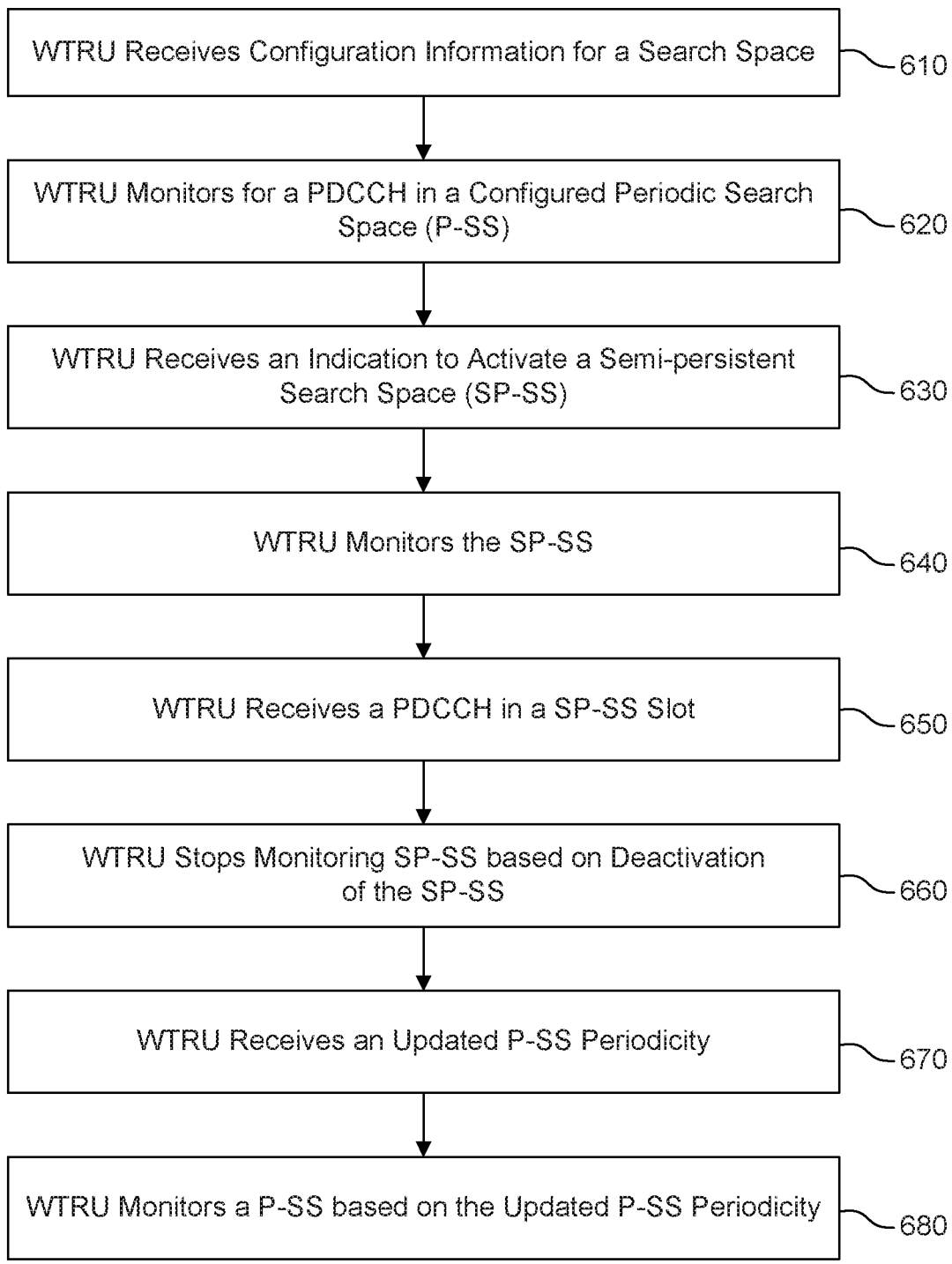
FIG. 6 shows an example of using a semi-persistent search space (SP-SS) for support of burst traffic.

FIG. 6 shows an example of using a SP-SS for support of burst traffic. A WTRU may receive configuration information of one or more search spaces (610). The configuration information may include a monitoring periodicity of a search space. The monitoring periodicity may indicate a time slot or time slot repetition. The configuration information may include a monitoring offset. The configuration information may include a monitoring pattern. The WTRU may receive configuration information for multiple types of search spaces. For example, the WTRU may receive configuration information for a P-SS and an SP-SS. A SP-SS may be associated with one or more P-SSs. One or more search space configurations of a P-SS may be used or reused in an associated SP-SS. Configuration of an associated P-SS, which may activate a SP-SS, may be used for monitoring the SP-SS and may include a DCI configuration, format, contents (e.g., presence of TCI states): an aggregation level; a number of PDCCH candidates per aggregation level, a number of symbols, or monitoring symbols within a slot. An SP-SS may be configured with a subset of configuration information for a P-SS. The configuration information of a P-SS which may not be in the subset of configuration information may be determined based on the associated P-SS. The WTRU may receive the configuration information from a gNB. The WTRU may receive the configuration information via radio resource control (RRC) signaling or an RRC message.

A WTRU may send an indication of its capability to support a SP-SS. The WTRU may send the indication to a gNB. In an example, a WTRU may support the SP-SS if the WTRU has a capability to receive an activation/deactivation signal for an SP-SS. In an example, a WTRU may support SP-SS if the WTRU has a capability to support a power saving mode. A gNB may have knowledge of a WTRU's capability to support a SP-SS without the WTRU sending an indication. A gNB may know from a preconfiguration or based on WTRU class whether a WTRU supports a SP-SS.

The WTRU may monitor for a control channel (e.g. PDCCH) in a configured P-SS (620). The P-SS may have a monitoring periodicity, for example a 4 slot periodicity, as shown in FIG. 5. The WTRU may monitor when the search space is activated or in active state. A WTRU may not monitor in the search space when the search space is deactivated or not in an active state or in a deactivated state. The WTRU may monitor the P-SS in a time location in accordance with the configured periodicity and monitoring symbols.

The WTRU may receive information to activate a SP-SS (630). The information may be received in a PDCCH in a P-SS. An SP-SS to activate may be associated with the P-SS. The information may include an indication to deactivate an SP-SS. The information may be for a plurality of associated SP-SSs.

The WTRU may monitor the SP-SS for a PDCCH (640). The SP-SS may have a monitoring periodicity configured, which may be different than the monitoring periodicity of the associated P-SS. For example in FIG. 5, the P-SS has a 4 slot periodicity and the SP-SS ha a 1 slot periodicity. A search space may be activated or deactivated via L1 signaling for example in a DCI received in a PDCCH. A search space may be activated or deactivated via L2 signaling for example in a MAC-CE. The WTRU may monitor the search space when the search space is in an active state (e.g., activated). For example, a search space may be configured and a WTRU may monitor the search space when the WTRU receives an activation (e.g., activation indication or activation signal) for the search space. If the information received in the P-SS indicates an activation of a SP-SS, the WTRU may monitor for a PDCCH in the SP-SS. The WTRU may monitor in the SP-SS based on the configuration information received. When a SP-SS is activated, a WTRU may skip monitoring the associated P-SS. The WTRU may skip monitoring the associated P-SS if the blind decoding complexity or number of CCEs for channel estimation is higher than a threshold (e.g., WTRU capability). On a condition that the information received in the P-SS indicates a deactivation of a SP-SS, the WTRU may stop monitoring in the SP-SS.

A SP-SS may be activated and/or deactivated from a slot #n based on for example, a DCI, a MAC-CE, a predetermined sequence or preamble, a bit sequence scrambled with CRC of a PDSCH, or a DM-RS sequence of a PDSCH.

In a case of a DCI received in a slot #n−x, the DCI may include activation and/or deactivation information for the search space and x may be a non-negative integer (e.g., 0, 1, 2, . . . ). A WTRU may monitor or receive the DCI for a SP-SS activation (and/or deactivation) in a P-SS which may be based on a WTRU-specific PDCCH or a group-common PDCCH. A group-common PDCCH may be shared by a group of WTRUs. One or more radio network temporary identifier (RNTI) may be used for a DCI in P-SS. If a first RNTI is used to scramble a CRC of the DCI in a slot #n−x, an associated SP-SS may be activated in the slot #n and the SP-SS may be in an active state until it is deactivated. If a second RNTI is used to scramble a CRC of the DCI, an associated SP-SS may stay in a current state (e.g., inactive or active). If a second RNTI is used to scramble a CRC of the DCI, an associated SP-SS may be deactivated. The DCI herein used for activation of an SP-SS may be also used to schedule a PDSCH or a PUSCH. The x value may be indicated in the DCI.

In a case of a MAC-CE received in a slot #n−x wherein x may be a non-negative integer, the MAC-CE may include an activation and/or deactivation message for one or more SP-SSs. The x value may be determined based on a HARQ-ACK timing of a PDCCH carrying the MAC-CE. The x value may be indicated in the MAC-CE.

If a WTRU received a sequence or a preamble in a slot #n−x, a SP-SS may be activated from slot #n and stay in an active state until it is deactivated. The sequence or preamble may be a WUS. The WUS may be configured or used for a SP-SS. If a search space is a P-SS, no wake-up may be used and the search space may be monitored in the configured slots. The WUS may be configured per search space.

In a case of a bit sequence scrambled with a CRC of a PDSCH, the PDSCH may be scheduled in a slot #n−x for example. If the CRC of the PDSCH is scrambled with a specific bit sequence, an associated SP-SS may be activated in slot #n, where the PDSCH may be scheduled by a P-SS. One or more bit sequences for scrambling may be used. If a WTRU receives a first bit sequence, an associated SP-SS may stay in a current state (e.g. active or inactive). If the WTRU receives a second bit sequence, an associated SP-SS may be activated in slot #n. In an example, a first bit sequence may be all zeros and a second bit sequence may be all ones or all zeros except one bit. If a PDSCH includes more than one codeblock or codeblock group, a CRC of all codeblocks or codeblock groups may be scrambled with the bit sequence. The CRC of a first or a last codeblock or codeblock group may be scrambled with the bit sequence.

In a case of a DM-RS sequence of a PDSCH, the DM-RS sequence may be scrambled with a specific identity. For example, a PDSCH may be scheduled in a slot #n−x and if the DM-RS is scrambled with a first identity, the associated SP-SS may stay in a current state (e.g., active or inactive). If the DM-RS is scrambled with a second identity, an associated SP-SS may be activated in slot #n. A DM-RS scrambling identification (ID) may determine an activation of the associated SP-SS. The DM-RS scrambling ID may be used for scrambling sequence initialization.

The WTRU may receive a PDCCH in the SP-SS (650). The WTRU may receive a PDSCH based on a resource allocation in a received PDCCH. For example the WTRU may receive a PDSCH burst in slots s+5, s+6, s+7, s+8, s+9, and s+10 as shown in FIG. 5.

The WTRU may stop monitoring the SP-SS based on a deactivation of the SP-SS (660). An active SP-SS may be deactivated based on a timer or a time window. A timer may start from a slot where the SP-SS is activated. A WTRU may monitor an SP-SS if an associated timer is running. If the timer stops, the WTRU may stop monitoring the SP-SS. The timer may stop if a WTRU does not detect a DCI scheduled for the WTRU in K slots (or consecutive K slots). The timer may stop if the WTRU needs to switch a bandwidth part (BWP). The timer may stop if a predefined or configured time window is passed. The time window may start from a slot where the SP-SS is activated. The timer may stop if a buffer, such as an uplink buffer, is empty. The timer may stop if the WTRU receives a timer expire command. A timer expire command may be received from a gNB. The time window may be determined based on a buffer size reported. For example, if a reported buffer size is larger than a first threshold, a first time window size may be used and if a reported buffer size is larger than a second threshold, a second time window size may be used. An active SP-SS may be deactivated if a WTRU receives a deactivation signal. A deactivation signal may be received from a gNB. The deactivation signal may be a go-to-sleep (GOS) signal. An active SP-SS may be deactivated after a number of slots indicated from an activation signal. For example, an activation signal may include a time length during which the SP-SS is active and the time length may be based on the number of slots. One or more time length values may be predetermined, predefined, configured, or used and one time length value may be indicated in the activation signal.

Time locations of a SP-SS may be predetermined based on a higher layer configuration. An activation time of a SP-SS may not change the time locations of the SP-SS. A WTRU may monitor a SP-SS when it is active in a predetermined location.

An activation indication may determine whether the WTRU needs to monitor the SP-SS. Time locations of an SP-SS may be determined based on an activation time. For example, a periodicity of SP-SS and monitoring symbols within a slot may be preconfigured while the starting offset may be determined based on the time location where the WTRU receives an activation indication or the SP-SS is activated.

An SP-SS and it associated P-SS may be located or configured in different BWPs. If the SP-SS is activated, the associated P-SS may not be monitored by a WTRU and the WTRU may switch to the BWP configured for the SP-SS. If the SP-SS is deactivated, the WTRU may switch back to the BWP for the associated P-SS. For example, a first BWP may be configured with a P-SS and a second BWP may be configured with an associated SP-SS. The P-SS may activate/deactivate the associated SP-SS which may be located in a different BWP. Both the associated P-SS and the SP-SS may be monitored by a WTRU if the WTRU has capability to receive more than one BWP at the same time.

An SP-SS may be used or allowed to be used when a P-SS, or an associated P-SS, periodicity is larger than a threshold. For example, a WTRU may monitor for an activation signal for a SP-SS if its associated P-SS periodicity is larger than a threshold. The periodicity of a SP-SS may be longer than that of the associated P-SS. A WTRU may skip monitoring of an activation signal for a SP-SS if its associated P-SS periodicity is shorter than the threshold An SP-SS may be activated/deactivated for a downlink, uplink, or both. For example, if an SP-SS is activated for downlink (DL) traffic or downlink transmission, a WTRU may monitor for a DL DCI format in the SP-SS. If a SP-SS is activated for uplink (UL) traffic or uplink transmission, a WTRU may monitor for an UL DCI format in the SP-SS. If a WTRU is in an active time in DRX operation to monitor a SP-SS, the WTRU may perform DL measurements (e.g., RRM, RLM, CSI) if the SP-SS is activated for a downlink transmission. The WTRU may skip performing DL measurements and/or skip reporting a periodic measurement (e.g., periodic CSI) if the SP-SS not activated for DL transmission or is activated for a UL transmission only. If a WTRU is in an active time in DRX operation and the WTRU monitors SP-SS for an UL transmission (e.g., only for UL transmission), the WTRU may skip reporting periodic measurement (e.g., periodic CSI).

For DRX operation, an inactivity timer or a retransmission timer may be applied for a P-SS. A WTRU may need to monitor a SP-SS if activated irrespective of the DRX status, for example even when in an OFF duration. A SP-SS status (e.g., active) may override a DRX status (e.g., OFF duration). If a SP-SS is inactive, a WTRU may follow the DRX status (e.g., ON duration or OFF duration). Monitoring of a SP-SS may not increase an inactivity timer or a retransmission timer. Configured DRX parameters or operations may not apply for the SP-SS.

The WTRU may receive an updated configuration for the P-SS (670). The updated configuration may include an updated periodicity. The updated configuration may be received in a DCI in a PDCCH in a P-SS. For example, the WTRU may receive an updated periodicity for the P-SS in slot s+12 in FIG. 5. The WTRU may monitor the P-SS based on the updated periodicity (680). For example, the WTRU may monitor a P-SS in slots s+14, s+16, and so on based on the updated P-SS periodicity.

A periodicity of the P-SS and/or SP-SS may be dynamically changed. A search space periodicity may be changed with a dynamic indication. A search space periodicity may be changed with or without RRC reconfiguration. A search space monitoring periodicity may be shortened, for example, when burst traffic arrives. The search space monitoring periodicity may be increased, for example, when the data buffer is empty. The periodicity change may be indicated via L1 such as in a DCI and/or L2 signaling such as in a MAC-CE.

One or more periodicity values may be configured for a search space. A default periodicity may be determined based on a smallest periodicity value. A default periodicity may be determined based on a largest periodicity value. A default periodicity may be determined based on a first periodicity in a set of configured periodicities. A smallest periodicity value or a largest periodicity value may be used as a default periodicity. A first periodicity in a set of configured periodicities may also be used as a default periodicity.

One or more periodicity values may be configured, for example, via RRC signaling. If a single periodicity value is configured, the periodicity for the search space may be the configured value. If more than one periodicity value is configured, one of the configured periodicity values may be indicated. The WTRU may receive the indication via L1 signaling, for example in a DCI, and/or L2 signaling, for example in a MAC-CE. The WTRU may use the indicated periodicity, for example after receiving the indication. The WTRU may use the indicated periodicity a configured, indicated or known time after receiving the indication. A WTRU may also use a default value if the WTRU is configured with more than one periodicity value before reception of the indication of a periodicity value from L1 and/or L2 signaling.

If a periodicity or periodicity change is indicated, for example, via L1 or L2 signaling, the indicated or updated periodicity may be valid during a time window. For example, when a WTRU receives a periodicity or updated periodicity for a search space, the WTRU may monitor the search space during a time window using the indicated periodicity and use or switch back to a previously configured, previously indicated or a default periodicity before and/or after the time window. The time window may be determined based on a higher layer configuration. The time window may be determined based on a timer such as an inactivity timer. In a case of the higher layer configuration, a WTRU may use or switch back to a configured or default periodicity to monitor a search space after the time window. In a case of the timer, such as an inactivity timer, if a WTRU does not receive a DCI during K slots (e.g., K consecutive slots) when using an indicated or updated periodicity, the WTRU may consider a timer (e.g., inactivity timer) is expired and may use or switch back to a configured or default periodicity.

Time locations of a search space with one or more periodicity values may be determined based on a configuration information of the search space. When a periodicity value is indicated or updated, a WTRU may monitor the time locations associated with the indicated or updated periodicity value after x slots from the slot where the periodicity indication or update is received. For example, the x value may be predefined to a fixed value (e.g., 4). The x value may be a non-negative integer value. The x value may be determined based on numerology. The x may be a configured value, for example configured by RRC. The x value may be indicated dynamically, for example, by a DCI or a MAC-CE. The x value may be included with an indication to change or update the periodicity.

A periodicity of a search space may be determined or updated based on information such as a specific HARQ-process number, a number of negative HARQ-ACK transmitted, a slot configuration indicated from a slot format indicator, or a first uplink grant after a scheduling request.

In a case of a specific HARQ-process number, a WTRU may receive a downlink grant or an uplink grant with a specific HARQ-process number. For example, if a WTRU receives a PDSCH with a HARQ process number N (e.g., #16), the WTRU may monitor a search space with an updated periodicity. A gNB may determine a HARQ process number to change a periodicity of the search space. For example, a first set of HARQ process numbers (e.g. 0-3) may be associated with a first search space periodicity and second set of HARQ process numbers (e.g. 4-7) may be associated with a second search space periodicity. A WTRU may determine the periodicity of the search space based on a HARQ process number received, for example, for the latest PDSCH or PUSCH.

In a case of slot configuration, a first slot configuration may be associated with a first periodicity value of the search space and a second slot configuration may be associated with a second periodicity value of the search space.

In a case of a first uplink grant after a scheduling request, a first monitoring periodicity for a search space may be used for monitoring for an uplink grant after a scheduling request is transmitted and before a reception of the first uplink grant. A second monitoring periodicity for the search space may be used if a WTRU received a HARQ-ACK for the uplink transmission scheduled by the first uplink grant. The HARQ-ACK may be an uplink grant with the same HARQ process number (e.g., with or without a new data indicator toggled). If the WTRU received the HARQ-ACK for the uplink transmission in a slot #n−x, the second monitoring periodicity for the search space may be used from a slot #n. A second monitoring periodicity for the search space may be used if a first uplink grant includes an indication of a monitoring periodicity change or update. The indication may be based on a RNTI. A first monitoring periodicity for a search space may be used for monitoring an uplink grant after a scheduling request is transmitted until a monitoring periodicity change command is received.

Monitoring symbols within a slot for a search space may be increased or decreased dynamically via L1 and/or L2 signaling. The search spaces in different symbols within a slot may schedule a PDSCH in different slots. The PDSCH may be a long PDSCH (e.g., PDSCH type A) or a short PDSCH (e.g., PDSCH type B).

A search space may be triggered, scheduled, or indicated to be monitored by a DCI. The search space may be triggered or scheduled X slots or Y OFDM symbols after a slot on which the DCI is transmitted. The DCI may schedule one or more search spaces. A DCI which may trigger one or more search spaces may be referred to herein as a triggering DCI, a reference DCI, or a first DCI.

A first DCI may trigger a plurality of aperiodic search spaces (A-SSs) or aperiodic monitoring occasions. The first DCI may include a number of A-SSs or monitoring occasions, a starting slot, a gap between search spaces (e.g., equal space), an aggregation level of A-SSs, and/or a REG bundle size.

Figure 7:
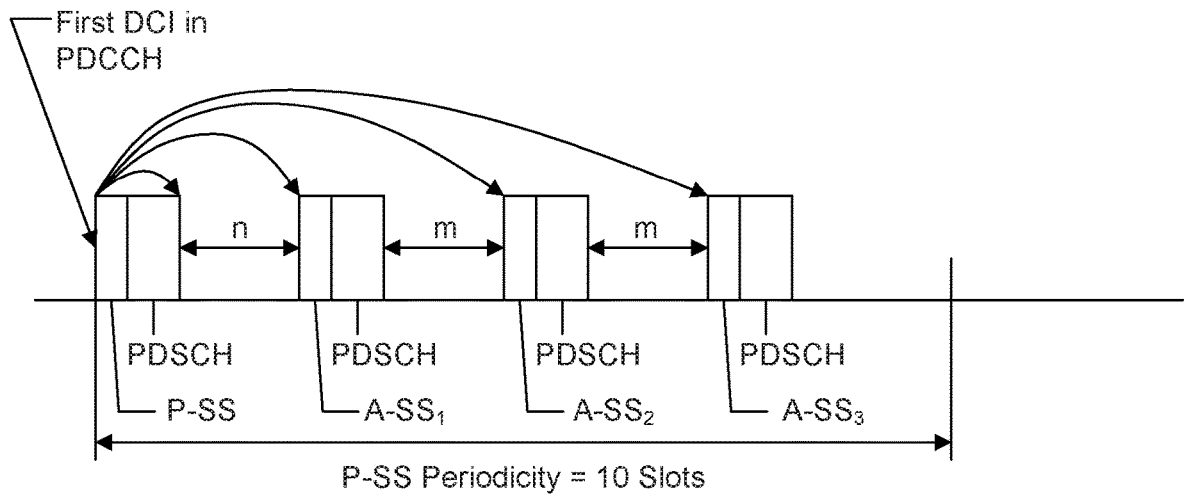
FIG. 7 shows an example of first DCI that trigger a plurality of aperiodic search spaces (A-SSs)

FIG. 7 shows an example of first DCI that trigger a plurality of A-SSs. A first DCI may schedule three search spaces (or three monitoring occasions) such as $A\text{-}SS_1$, $A\text{-}SS_2$ and $A\text{-}SS_3$ in FIG. 7. The spacing between consecutive scheduled/triggered search spaces may be equally spaced with m slots and the spacing between the first triggered or scheduled search space and the slot where the DCI was transmitted may be n slots. It may be that n=m. In the example of FIG. 7, the number of A-SSs=3; the starting slot=slot s0+n; and the gap between search spaces, which are of equal space is m. The spacing in terms of number of slots or symbols between two monitoring occasions may be different from one another Overhead of the first DCI may be reduced if the triggered search spaces are located in time between two consecutive P-SSs. As an example, in FIG. 7, the spacing between the DCI and the next periodic search space is 10 slots. The scheduled search spaces may be located on some of these 10 slots. If the starting slot and either the number of A-SSs or the gap between the A-SSs are given, the WTRU may determine the location of the scheduled search spaces. The overhead of the first DCI may further be reduced if n=m. In this example, the DCI may indicate the number of A-SSs and the location of those search spaces may be selected such that there is an even spacing between the last search space and the slot where the DCI was transmitted.

The first DCI may trigger one or more search spaces and may also schedule a PDSCH or a PUSCH. A WTRU may receive a first DCI in a P-SS and the WTRU may receive a second DCI in a triggered A-SS. The first DCI may include information for triggering A-SSs and scheduling of a PUSCH or a PDSCH. The second DCI may include scheduling information of a PUSCH or a PDSCH. The first DCI and the second DCI may be a same DCI format, however the contents may be different. A DCI size for the first DCI and a DCI size for the second DCI may be different. The associated CORESET for an A-SS may be the same as that of the P-SS in which a WTRU may receive the first DCI.

The first DCI may trigger one or more search spaces with a pattern which may determine the slots within a time window in which a WTRU may need to monitor the search spaces. The time window may be configured via a higher layer signaling. The time window may be determined based on a periodicity of an associated P-SS. For example, if the periodicity of an associated P-SS is x, the time window may be x. The pattern may be a bitmap which may indicate the slots within a time window for the A-SS. In the bitmap, each bit may be associated with one or more slots. If a bit in the bitmap indicates a value, for example '1', a WTRU may need to monitor the search space in the associated slots. If a bit in the bitmap indicates a different value, for example '0', a WTRU may skip monitoring the search space in the associated slot. One or more patterns may be used and indicated by its associated RNTI which may be scrambled with a CRC. One or more RNTIs may be used and each RNTI may be associated with a pattern.

A first DCI may schedule search spaces not only between the DCI slot and the following P-SS but also over multiple periods of the P-SS. For example, the DCI can schedule search spaces between slots [0-9], [10-19], [20-29], or the like, assuming that the periodicity is 10 slots and the DCI is transmitted on slot 0. The first DCI may also indicate a number of periods over which additional search spaces are scheduled.

The WTRU receiving the DCI may be expected to perform blind decoding of a control channel (e.g. PDCCH) during the scheduled search spaces and/or the periodic search spaces.

A DCI may trigger a single A-SS. The DCI may indicate presence/absence of a following A-SS. The DCI may indicate a time offset from a current search space. The DCI may indicate an aggregation level of the A-SS. The DCI may indicate a REG bundle size of the A-SS.

Figure 8:
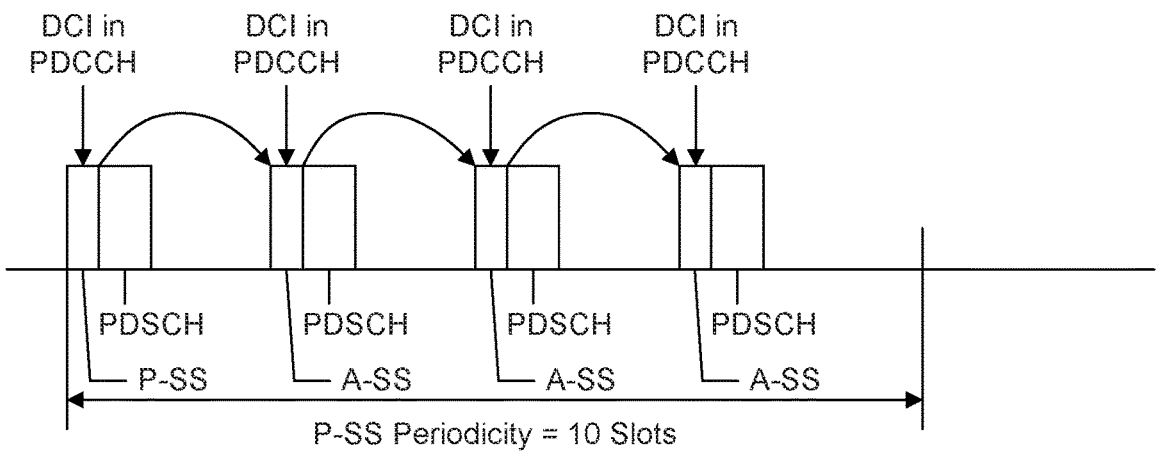
FIG. 8 shows an example of a DCI triggering a single aperiodic search space (A-SS)

FIG. 8 shows an example of a DCI triggering a single A-SS. If a DCI is transmitted in a first A-SS, then this DCI may trigger a second A-SS. If a DCI is transmitted in the second A-SS, then this DCI may trigger a third A-SS, and so on. If a DCI is not detected in an A-SS, then the WTRU may not perform blind detection of an A-SS and only perform blind decoding of the P-SS.

A DCI may trigger an A-SS. The A-SS may be associated with a same CORESET with the search space where the DCI is received. A single bit field may indicate the presence/absence of the A-SS. A slot/symbol offset for a time location of the A-SS may be predetermined or preconfigured. An RNTI may indicate the presence/absence of the A-SS.

Figure 9:
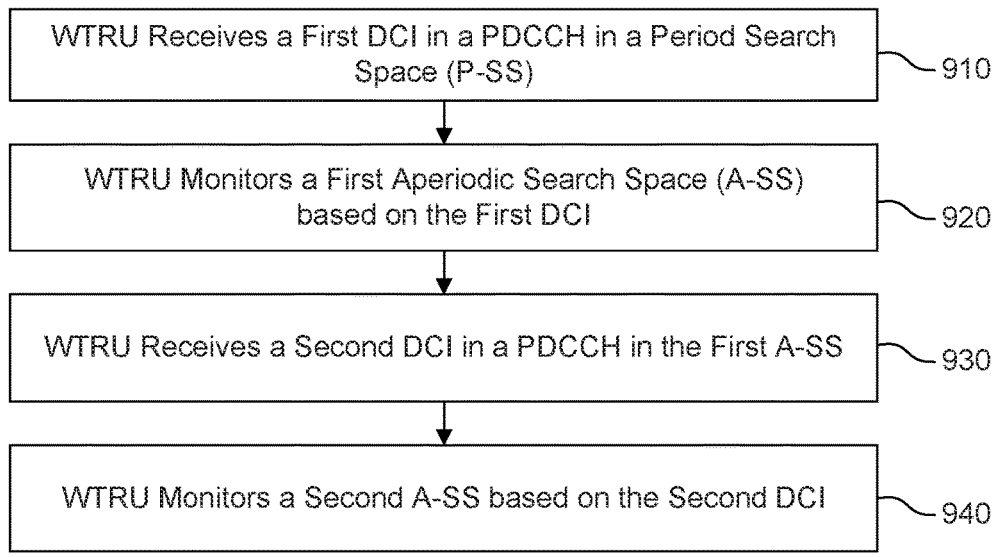
FIG. 9 shows an example method of a DCI triggering a single aperiodic search space (A-SS)

FIG. 9 shows an example method of a DCI triggering a single A-SS. A WTRU may receive a first DCI in a PDCCH in a P-SS (910). This first DCI may schedule an A-SS$_1$. The WTRU may monitor the scheduled A-SS$_1$ for a PDCCH based on the first DCI (920). The WTRU may receive a second DCI in a PDCCH in A-SS$_1$ (930). The second DCI may schedule an A-SS$_2$. The WTRU may monitor the scheduled A-SS$_2$ for a PDCCH based on the second DCI (940).

Figure 10:
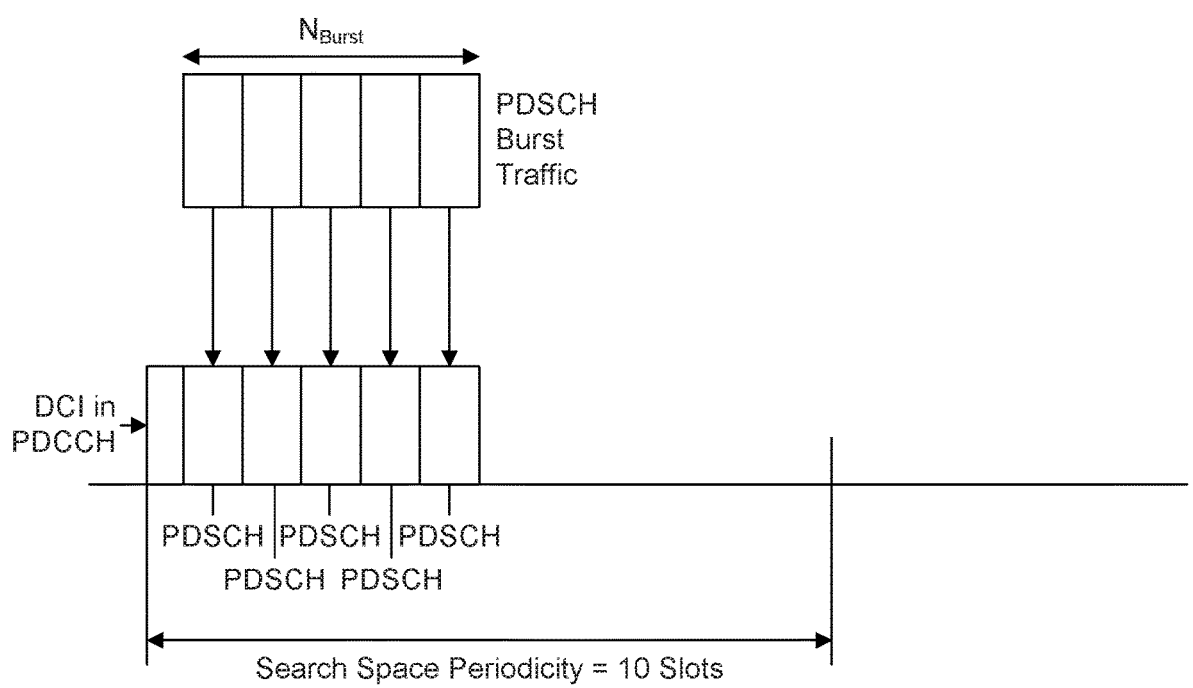
FIG. 10 shows an example of a PDSCH burst transmission with a single DCI that schedules the burst.

FIG. 10 shows an example of a PDSCH burst transmission where a single DCI may carry all or some of the required scheduling information for an entire burst. A PDSCH burst may be composed of $N_{BURST}$ slots within WTRU active time (i.e., $N_{BURST} T_{UE\_active}$).

A WTRU may monitor or attempt to decode a DCI in a search space for a single DCI burst (SDB) PDSCH transmission. A burst PDSCH transmission may be $N_{BURST}$ PDSCH transmission over one or more slots.

Each PDSCH in the burst may be a long PDSCH (PDSCH type A) or a short PDSCH (PDSCH type B). Within a burst PDSCH transmission, all PDSCHs may be the same PDSCH type. A PDSCH type of the first PDSCH within a burst may determine the PDSCH type for the rest of PDSCH transmission.

A WTRU may determine the number of PDSCHs ($N_{BURST}$) and/or slots within a burst dynamically based on for example, a DCI field, a MAC CE, or RRC configuration. A WTRU may determine a SDB transmission or a single DCI single PDSCH (SDSP) transmission based on for example, a search space, a periodicity of search space, an RNTI scrambled with a CRC of the DCI, or a bit field in a DCI.

A WTRU may be configured with a search space and a PDSCH transmission scheme (e.g., SDB or SDSP) may be indicated in the search space configuration. The number of PDSCHs in a burst ($N_{BURST}$) may be in a search space configuration. If a WTRU receives a DCI in a first search space, the WTRU may receive, or expect, a first type of transmission, for example a PDSCH burst transmission. If a WTRU receives a DCI in a second search space, the WTRU may receive, or expect, a second type of transmission, for example a single PDSCH transmission.

In a case of a periodicity of a search space, if a periodicity of a search space is larger than a threshold, a WTRU may receive, or expect, a first type of transmission, for example, a PDSCH burst transmission with a single DCI scheduling. If the periodicity of the search space is smaller than a threshold, the WTRU may receive, or expect, a second type of transmission, for example, a single PDSCH transmission with a single DCI scheduling. This may apply when a WTRU is in a power saving mode and/or served with burst traffic. The number of PDSCHs in a burst may be determined based on a periodicity of the search space.

In case of an RNTI scrambled with a CRC of a DCI, one or more RNTI may be used. If a WTRU receives a first RNTI which may be scrambled with a CRC of the DCI, the WTRU may receive, or expect, a first type of transmission, for example, a SDB transmission. If the WTRU receives a second RNTI which may be scrambled with a CRC of the DCI, the WTRU may receive, or expect, a second type of transmission, for example a SDSP transmission. The first RNTI may be a SDB-RNTI. The second RNTI may be a SDSP-RNTI or C-RNTI.

In a case of a bit field in a DCI, a single bit in the DCI may indicate whether it is for a SDB transmission or a SDSP transmission. A single DCI may schedule one or more PDSCHs and the DCI may include scheduling information of one or more PDSCHs.

For a SDB PDSCH transmission, the WTRU may use a resource allocation information field in the DCI for the decoding of all the $N_{BURST}$ PDSCH transmissions within the burst The resource allocation information may include: carrier BWP, frequency/time domain resource allocation/mapping, ZP CSI-RS, transmission ports, TCI, sounding request, reference signal configuration, PUCCH related information for the duration of the burst. A WTRU may not need to receive or decode an information element for PDSCH rate matching. The WTRU may assume a similar rate matching as the first slot for the remaining slots within the burst. In absence of a DCI in the slots following the first slot, a WTRU may assume that a CORSET used in the first slot is used for rate PDSCH rate matching.

A WTRU may assume a fixed MCS information for decoding of $N_{BURST}$ PDSCH slots. A WTRU may determine the MCS dynamically from an information element, for example, a DCI field, or from a semi-static configuration for SDB PDSCH operation.

For power saving, a WTRU may not maintain its buffer for potential soft combining with a future PDSCH transmission within a next WTRU active ON period. For example, a WTRU in SDB PDSCH mode may assume a new data indicator (NDI)=1, and/or redundancy version RV=0 for each burst.

A WTRU may determine HARQ process numbers for one or more PDSCHs in a burst PDSCH transmission with a single DCI based one or more of the following.

A WTRU may receive a DCI and decode $N_{BURST}$ indices as the HARQ process numbers for each of the PDSCH within the burst. A WTRU may decode a single PDSCH-to-HARQ timing for ACK/NACK indication of the entire burst. The WTRU may indicate $N_{BURST}$ ACK/NACK messages within the determined uplink slot. A WTRU may decode multiple PDSCH-to-HARQ timings for ACK/NACK indications corresponding to each PDSCH within the burst. The WTRU may indicate $N_{BURST}$ ACK/NACK messages with the corresponding indicated timing.

A WTRU may receive a DCI and decode a single HARQ process number for the entire PDSCH burst. Each PDSCH in the burst may be considered or determined as a codeblock group (CBG) and a WTRU may report HARQ-ACK for each PDSCH (e.g., HARQ-ACK for each CBG). If HARQ-ACK bits for a PDSCH may be bundled for a PDSCH burst transmission, the bundle may be referred to as exclusive or (XOR) of HARQ-ACK bits. Each PDSCH in the burst may be considered or determined as a codeword and a WTRU may report HARQ-ACK for each PDSCH as a codeword. If the number of PDSCHs in the burst is larger than a threshold, HARQ-ACK bits for a group of PDSCHs may be bundled. The number of groups for HARQ-ACK bundling may be determined based on the number of PDSCHs in the burst. The number of groups for HARQ-ACK bundling may be determined based on uplink resources configured for HARQ-ACK transmission. A WTRU may indicate an ACK if all the PDSCH slots within the burst are decoded properly. A WTRU may expect retransmission of the same burst over a next active period.

A WTRU may maintain a soft buffer for a failed transmission for potential combining within a next burst. In a next active period, the WTRU may determine from a received DCI whether a retransmitted burst has the same transmission characteristics as the previous burst for potential combining. A WTRU may not attempt to decode the slots that were successfully decoded in a previous burst. A HARQ-ACK timing may be determined based on the last slot, or the first slot, used for the PDSCH burst transmission.

Figure 11:
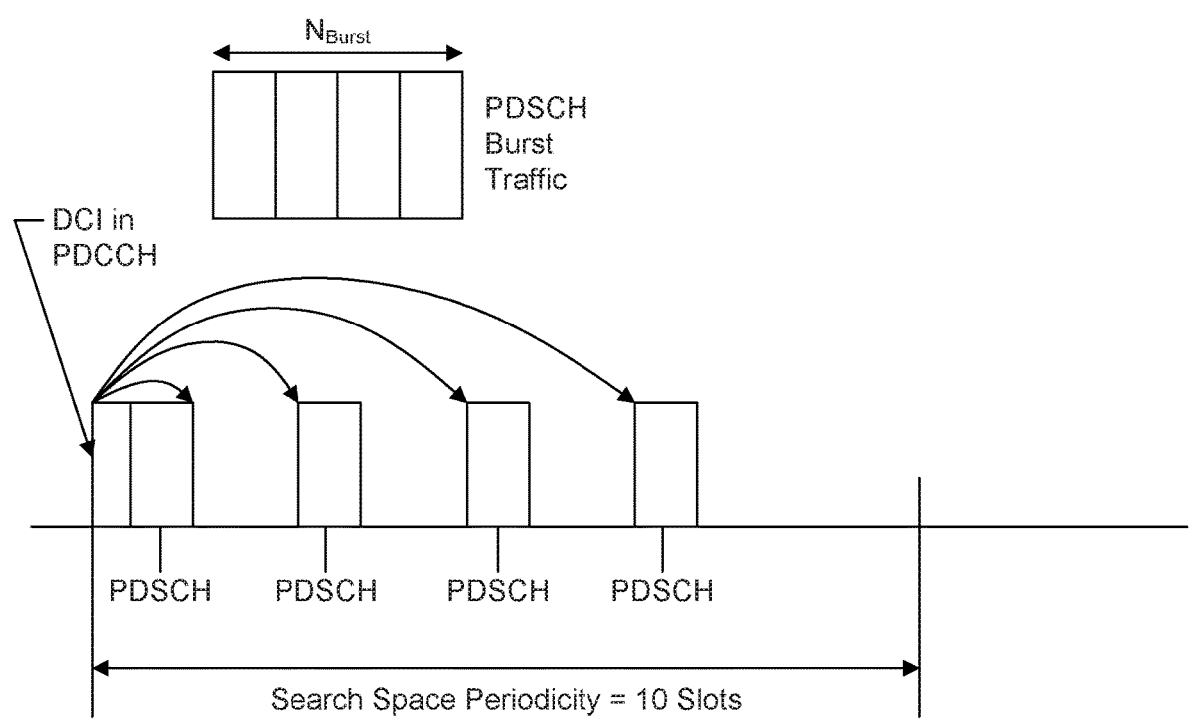
FIG. 11 shows an example configuration of PDSCH burst transmission.

FIG. 11 shows a configuration of PDSCH burst transmission. A single DCI may carry all or some of the required scheduling information for the entire burst. The WTRU may be required to determine the timing of each PDSCH within the burst. A WTRU may determine the timing of each PDSCH slot within the burst by assuming equal spacing within the WTRU active time. A WTRU may determine the spacing information dynamically from a DCI field or through its semi static configuration.

A single DCI may schedule one or more PDSCHs as a PDSCH burst transmission and the PDSCHs in the burst may be located in different slots.

The DCI may indicate a starting slot, for example a slot offset for the first PDSCH in the burst. The slots for the rest of PDSCHs in the burst may be determined based on consecutive downlink slots from the starting slot. The consecutive downlink slots from the starting slot may be used for the rest of the PDSCHs. The downlink slot may be a valid downlink slot which may contain downlink symbols more than a threshold. The threshold may be determined based on the number of downlink symbols in the starting slot. The threshold may be a predetermined value. The slots for the rest of the PDSCHs in the burst may be determined based on an offset value from the previous slot. The offset value may be indicated in the DCI for scheduling the PDSCH burst transmission. The offset value may be configured via a higher layer signaling.

The DCI may indicate one or more slot offsets for each PDSCH within the burst. One or more sets of offset values may be configured via a higher layer signaling (e.g., RRC and/or MAC-CE) and a set of offset values may be indicated in the DCI.

Handling of burst traffic with a C-DRX is described herein. Example of using a SP-SS or a search space with dynamic or semi-persistent periodicity are described herein.

One or more DRX timer values may be determined or may be a function of a type or periodicity of one or more search spaces such as for example, one or more search spaces that a WTRU may be monitoring. A DRX timer and a DRX timer value may be used interchangeably herein.

A search space may be configured with a DRX timer that may be for a search space type or may be associated with a search space type. For example, a first DRX timer may be configured for a first search space type (e.g. P-SS) and a second DRX timer may be configured for a second search space type (e.g., SP-SS). A WTRU may use the first DRX timer when monitoring the first search space type or when one or more search spaces of the second search space type (e.g., for a HARQ process) are not configured, are not active, are not activated, or are deactivated. A WTRU may use the second DRX timer when monitoring the second search space type or when the second search space type is active or activated. For example, a WTRU may use a first DRX UL (or DL) retransmission timer when using a first type of search space (e.g. P-SS) and a second DRX UL (or DL) retransmission timer when using a second type of search space (e.g. SP-SS).

Use of a timer may include one or more of the following actions: starting or restarting the timer, stopping the timer, determining an active time (e.g., a DRX active time) based on whether the timer is running, performing an action or making a decision based on whether the timer is running, performing an action or making a decision based on whether the timer is expired, and/or monitoring for a PDCCH while the timer is running.

In an example, one or more actions and/or decisions related to one or more DRX timers may be the same as or similar to actions and/or decisions performed according to the 3GPP LTE specifications or 5G NR specifications.

A set of search spaces may be configured and a DRX timer may be configured for one or more search spaces in the set of search spaces. When a search space in the set of search spaces is active or activated, the DRX timer associated with the search space may be used or activated. When a search space in the set of search spaces is activated, a WTRU may switch from using a DRX timer associated with the default or previously used search spaces to using the DRX timer associated with the activated search space. A search spaces in the set of search spaces may be associated with a periodicity. A periodicity may be configured for a search space in the set of search spaces.

For example a first DRX timer may be associated with or configured for a first search space within a set of search spaces. A second DRX timer may be associated with or configured for a second search space within a set of search spaces. A WTRU may use the first DRX timer when: i) using the first search space (e.g., when monitoring for a PDCCH according to a timing or periodicity of the first search space); ii) when the first search space is active or activated; and/or iii) when the first search space is a default search space and no SP-SS are configured or activated. The WTRU may use the second DRX timer when: i) using the second search space (e.g., when monitoring for a PDCCH according to a timing or periodicity of the second search space); and/or ii) when the second search space is active or activated. The WTRU may revert back to using the first DRX timer when the second search space is deactivated.

A search space may be associated with and/or configured for a HARQ process. The examples and embodiments described herein for a search space or set of search spaces may be applicable, for example, separately, to a search space for a HARQ process or a set of search spaces for a HARQ process.

A search space, a search space set, and/or a DRX timer configuration may be received by a WTRU, for example, from a gNB. A search space, search space set, and/or a DRX timer activation and/or deactivation may be received by a WTRU, for example from a gNB.

A search space may be configured with a DRX timer associated with a periodicity of the search space. When a periodicity of the search space is activated, the DRX timer associated with the periodicity may be used or activated.

A search space may have at least a first periodicity and a second periodicity. The first periodicity may be the default periodicity. The second periodicity may be shorter or longer than the first periodicity. A DRX timer may have a first value associated with the first periodicity and a second value associated with the second periodicity. The second value may be shorter or longer than the first value. A WTRU may use the first DRX timer value when using the first periodicity. The WTRU may use the second DRX timer value when using the second periodicity, for example, when the second periodicity is activated. The WTRU may revert back to the first timer value when the second periodicity is deactivated.

A DRX timer may be a function of a search space periodicity such as a multiple of a search space periodicity. When a search space is activated or a periodicity of a search space is activated, the WTRU may determine the DRX timer value based on the search space periodicity and may use the determined DRX timer value.

A first periodicity for monitoring a search space or the periodicity of a first search space may have a value T1 such as 10 slots (e.g., 10 ms) which may allow a WTRU to sleep for a period. The DRX HARQ RTT timer for UL (or DL) for the first periodicity or the first search space may be T-RTT1. The DRX UL (or DL) retransmission timer for the first periodicity or the first search space may be T-RTX1. A second periodicity for monitoring a search space or the periodicity of a second search space may have a value T2 such as 1 slot (e.g., 1 ms) which may allow a WTRU to receive a PDCCH with grants and/or HARQ more quickly, for example, to better handle burst traffic. The DRX HARQ RTT timer for UL (or DL) for the second periodicity or the second search space may be T-RTT2. The DRX UL (or DL) retransmission timer for the second periodicity or the second search space may be T-RTX2. T-RTT2 may be less that T-RTT1. T-RTX2 may be less than T-RTX1.

T-RTT1 and/or T-RTX1 may be a function of at least one of T1 and/or the first search space type. T-RTT2 and/or T-RTX2 may be a function of at least one of: T1, T2, T-RTT1, T-RTX1, and/or the second search space type.

A WTRU may use values or timers with values T-RTT1 and/or T-RTX1 when using a first search space periodicity or a first search space. The WTRU may use values or timers with values T-RTT2 and/or T-RTX2 when using a second search space periodicity or the second search space, for example, when the second periodicity or second search space is activated. Subsequent to using the values or timers with the values T-RTT2 and/or T-RTX2, the WTRU may use the values or timers with the values T-RTT1 and/or T-RTX1 or other values such as T-RTT3 and/or T-RTX3, for example, when the second search space periodicity or the second search space is deactivated or when another search space periodicity or search space is activated.

A timer (e.g., DRX timer) or timer value associated with a search space or search space periodicity may be configured or determined by the WTRU. The WTRU may receive the configuration from a gNB.

A WTRU may receive a request or indication to stop a DRX timer such as an RTT or retransmission timer for the UL and/or DL. The request or indication may be received via L1 signalling, for example in a DCI in a PDCCH, or L2 signalling, for example in a MAC-CE. In response, the WTRU may stop the DRX timer or timers for which the stop was indicated or requested.

The stop may apply to one or more DRX timer types (e.g., UL RTT, DL RTT, UL and DL RTT, UL retransmission, DL retransmission, or UL and DL retransmission). The stop may apply to active DRX timers of one or more DRX types. The stop may apply to all DRX timers of one or more DRX types.

In the examples and embodiments described herein P-SS and SP-SS may be used as non-limiting examples of a search space type. Any other search space may be used and be consistent with this disclosure.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit/receive unit (WTRU), the method comprising:
    sending an indication of a capability to support search space switching;
    receiving configuration information for a first search space and a second search space, wherein the configuration information includes a monitoring periodicity of the first search space and a monitoring periodicity of the second search space;
    monitoring the first search space with the monitoring periodicity of the first search space;
    receiving a first downlink control information (DCI) in a first physical downlink control channel (PDCCH) transmission in a slot of the first search space, wherein the first DCI comprises an indication of an activation of the second search space;
    monitoring, in response to the indication of the activation of the second search space, the second search space using the monitoring periodicity of the second search space; and
    receiving a second DCI in a second PDCCH transmission in a slot of the second search space.

2. The method of claim 1, further comprising receiving a message in a physical downlink shared channel (PDSCH) transmission based on the first DCI in the first PDCCH transmission or the second DCI in the second PDCCH transmission.

3. The method of claim 1, wherein the monitoring periodicity of the first search space or the second search space indicates a time slot repetition.

4. The method of claim 1, wherein the configuration information is received from a gNB.

5. The method of claim 1, wherein the configuration information further includes a monitoring offset.

6. The method of claim 1, wherein the configuration information further includes a monitoring pattern that includes a symbol pattern.

7. The method of claim 1, wherein the monitoring periodicity of the first search space is larger than the monitoring periodicity of the second search space.

8. The method of claim 1, further comprising:
    stopping the monitoring of the second search space based on a second search space deactivation determination;
    monitoring the first search space with the monitoring periodicity of the first search space;
    receiving a third DCI, wherein the third DCI includes an updated monitoring periodicity of the first search space; and
    monitoring the first search space with the updated monitoring periodicity.

9. A wireless transmit/receive unit (WTRU) comprising:
a transceiver; and
processor, wherein:
    the transceiver is configured to send an indication of a capability to support search space switching;
    the transceiver is configured to receive configuration information for a first search space and a second search space, wherein the configuration information includes a monitoring periodicity of the first search space and a monitoring periodicity of the second search space;
    the processor is configured to monitor the first search space with the monitoring periodicity of the first search space;
    the transceiver is further configured to receive a first downlink control information (DCI) in a first physical downlink control channel (PDCCH) transmission in a slot of the first search space, wherein the first DCI comprises an indication of an activation of the second search space;
    the processor is further configured to, in response to the indication of the activation of the second search space, monitor the second search space using the monitoring periodicity of the second search space; and
    the transceiver is further configured to receive a second DCI in a second PDCCH transmission in a slot of the second search space.

10. The WTRU of claim 9, wherein the transceiver is further configured to receive a message in a physical downlink shared channel (PDSCH) transmission based on the first DCI in the first PDCCH transmission or the second DCI in the second PDCCH transmission.

11. The WTRU of claim 9, wherein the monitoring periodicity of the first search space or the second search space indicates a time slot repetition.

12. The WTRU of claim 9, wherein the configuration information is received from a gNB.

13. The WTRU of claim 9, wherein the configuration information further includes a monitoring offset.

14. The WTRU of claim 9, wherein the configuration information further includes a monitoring pattern that includes a symbol pattern.

15. The WTRU of claim 9, wherein the monitoring periodicity of the first search space is larger than the monitoring periodicity of the second search space.

16. The WTRU of claim 9, wherein:
    the processor is further configured to stop monitoring the second search space based on a second search space deactivation determination and monitor in the first search space with the monitoring periodicity of the first search space;
    the transceiver is further configured to receive a third DCI, wherein the third DCI includes an updated monitoring periodicity of the first search space; and
    the processor is further configured to monitor the first search space with the updated monitoring periodicity.

* * * * *